(12) United States Patent
Yamaguchi

(10) Patent No.: US 6,529,194 B1
(45) Date of Patent: Mar. 4, 2003

(54) RENDERING METHOD AND APPARATUS, GAME SYSTEM, AND COMPUTER READABLE PROGRAM PRODUCT STORING PROGRAM FOR CALCULATING DATA RELATING TO SHADOW OF OBJECT IN VIRTUAL SPACE

(75) Inventor: Akihiro Yamaguchi, Tokyo (JP)

(73) Assignee: Square Co., Ltd., Tokyo (JP)

( * ) Notice: Subject to any disclaimer, the term of this patent is extended or adjusted under 35 U.S.C. 154(b) by 248 days.

(21) Appl. No.: 09/583,031

(22) Filed: May 30, 2000

(30) Foreign Application Priority Data

Jul. 9, 1999 (JP) .......................................... 11-195214

(51) Int. Cl.[7] .............................................. G06T 15/50
(52) U.S. Cl. ...................................................... 345/426
(58) Field of Search ................................. 345/419, 420, 345/423, 426, 427, 582, 589, 606

(56) References Cited

U.S. PATENT DOCUMENTS 5,786,822 A     7/1998   Sakaibara et al. ........... 345/430
5,990,895 A  *  11/1999  Fujii et al. .................. 345/419

* cited by examiner

Primary Examiner—Almis R. Jankus
(74) Attorney, Agent, or Firm—Greenblum & Bernstein, P.L.C.

(57) ABSTRACT

A rendering method for generating an image similar to that with normal lighting calculation, without the calculation, when changing the position of a light source etc. in a virtual space; including waiting for an operational input of an operator or other input; changing the position of the light source or other state in accordance with any input; generating an interpolated shadow data set based on the position etc. of the light source at the current position; and drawing an object using the interpolated shadow data set, wherein when generating the interpolated shadow data set, the positional data of the light source etc. is acquired, the shadow data set relating to the positional data of the light source acquired etc. is selected from a plurality of shadow data sets corresponding to pre-set positions of the light source etc. and calculated in advance for a specific element of the object, and, when there are a plurality of selected shadow data sets, the plurality of shadow data sets are interpolated based on the acquired positional data of the light source to generate an interpolated shadow data set, and a rendering apparatus, game system, and computer readable program product storing a program using the same.

54 Claims, 19 Drawing Sheets

Fig. 6

| VERTEX \ INDEX | 0 | 1 | 2 | ... | M-1 |
|---|---|---|---|---|---|
| 0 | -20 | -40 | 20 | | 80 |
| 1 | -10 | -30 | 10 | | 100 |
| 2 | 0 | -20 | 0 | | 70 |
| 3 | 10 | -10 | -10 | | 60 |
| 4 | 30 | 0 | 5 | | 40 |
| ... | | | | | |
| N-1 | 70 | 60 | 90 | | -20 |

20

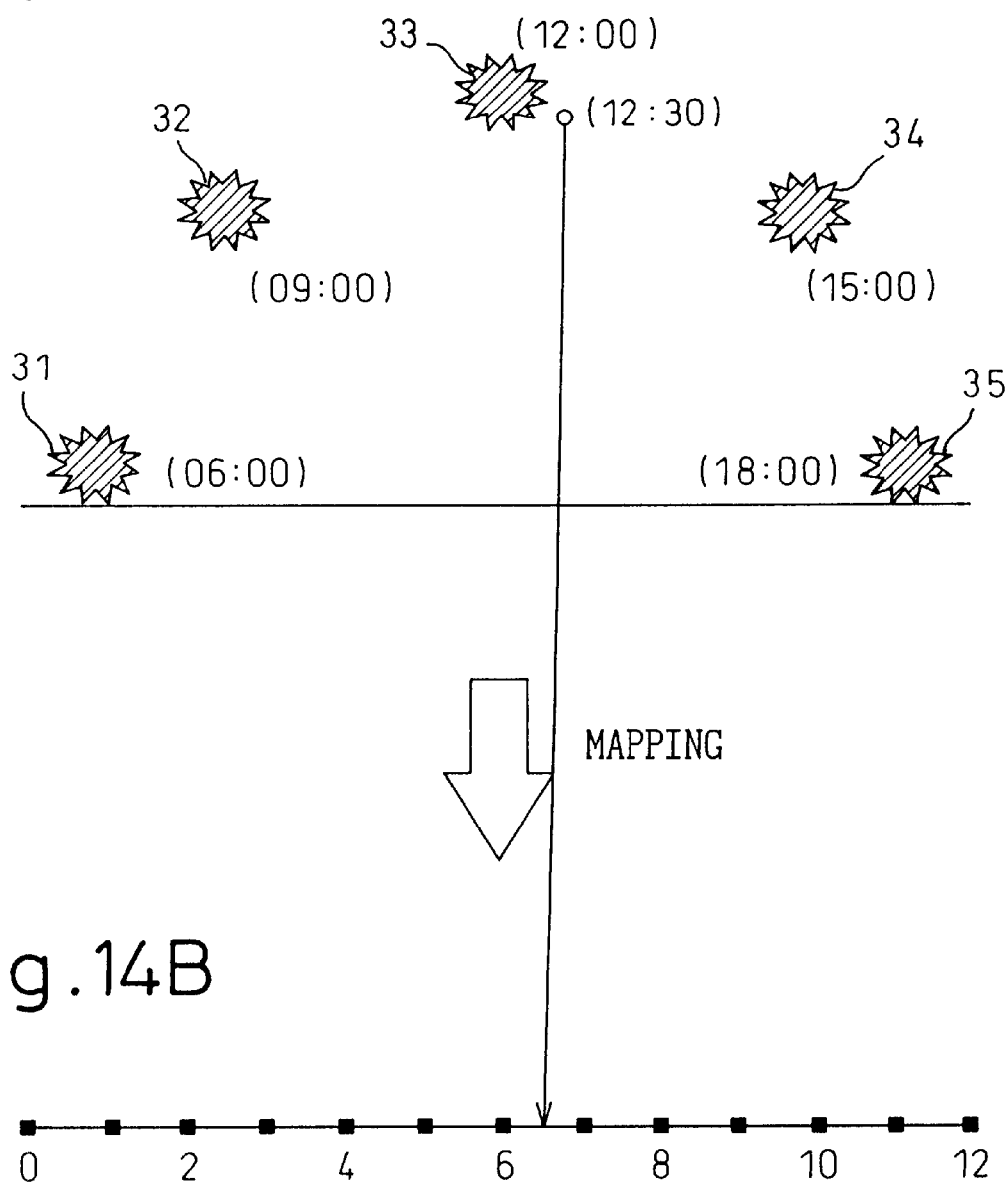

RENDERING METHOD AND APPARATUS, GAME SYSTEM, AND COMPUTER READABLE PROGRAM PRODUCT STORING PROGRAM FOR CALCULATING DATA RELATING TO SHADOW OF OBJECT IN VIRTUAL SPACE

BACKGROUND OF THE INVENTION

1. Field of the Invention

The present invention relates to the calculation of shadow data in a computer graphic, and more particularly, to a rendering method and apparatus, game system, and computer readable program product that stores a program for calculating data relating to the shadowing of an object in a virtual space.

2. Description of the Related Art

In the past, in game systems, the shadow of an object caused by light emitted from a light source in a three-dimensional space, that is, a virtual space, was rarely drawn. When drawing a shadow, the polygons of the object were projected on a plane able to give a shadow by the light emitted from the light source and the plane including the projected polygons was transformed in perspective so as to draw the shadow of the polygons on the screen. When the object expressed the face of a person etc., the object included a large number of polygons and the shadow of the polygons could be projected on other polygons. If there are n (where n is a natural number) number of polygons, processing for projecting polygons for the square of n times is necessary. Therefore, the amount of calculation ends up becoming greater and the speed of drawing becomes slower. Further, if the light source moves, the projection processing must be performed once again. Further, when using the technique of ray tracing for improving the image quality, the amount of calculation for the lighting increases more. It is therefore not practical to move the position of the light source etc. interactively.

On the other hand, processing when moving the perspective is shown in U.S. Pat. No. 5,786,822. This patent assumes several directions for viewing the surface of an actual object forming the basis of the texture data or the surface of an object prepared by computer graphics etc., provides sets of different texture data for every direction, and selects one of the sets of texture data corresponding to the direction in which the surface of the object is viewed for mapping at the time of displaying the object. Further, the above specification discloses, during the processing for selecting the texture data, to select the texture data for the plurality of assumed directions close to the direction in which the surface of the object is actually viewed when that direction does not match with a direction assumed in advance (assumed direction), interpolates the selected texture data from the difference between the direction in which the object is actually viewed and these assumed directions, and maps the thereby obtained data on the displayed object surface as texture data for the direction in which the object is actually viewed.

With this technique, however, the line of sight or perspective and texture data are linked. The texture data never includes portions of the object to be displayed that are not visible from the direction of the line of sight or the perspective.

SUMMARY OF THE INVENTION

An object of the present invention is to provide a rendering method and apparatus, game system, and computer readable program product that stores a program able to generate a similar image as with a normal lighting calculation when changing the position of a light source in a virtual space.

According to a first aspect of the present invention, there is provided a method of rendering an object in a virtual space, comprising converting an absolute position of a light source in the virtual space or a relative position between the object and the light source to a position of a point in a shadow data set space comprised of points corresponding to preset light source positions and obtaining the position of the point in the shadow data set space as positional data of the light source; selecting from a plurality of data sets relating to a shadow corresponding to a preset light source positions and calculated and stored in advance for a specific element of the object data set relating to shadow relating to the obtained positional data of the light source; interpolating from a plurality of data sets relating to shadow based on the obtained positional data of the light source to generate an interpolated shadow data set when there are a plurality of data sets relating to shadow selected; and using the interpolated shadow data set to draw the object in the virtual space.

According to a second aspect of the present invention, there is a method of rendering an object in a virtual space, comprising designating a position of a light source in the virtual space; converting the designation to a position of a point in a shadow data set space comprised of points corresponding to preset light source positions and obtaining the position of the point in the shadow data set space as positional data of the light source; selecting from a plurality of data sets relating to shadow corresponding to preset light source positions and calculated and stored in advance for a specific element of the object a data set relating to shadow relating to the obtained positional data of the light source; interpolating from a plurality of data sets relating to shadow based on the obtained positional data of the light source to generate an interpolated shadow data set when there are a plurality of data sets relating to shadow selected; and using the interpolated shadow data set to draw the object in the virtual space.

The method preferably further comprises, when obtaining the positional data of the light source, selecting from a plurality of data sets relating to a shadow corresponding to preset light source positions and calculated and stored in advance for a vertex of a polygon of the object or a surface of the object a data set relating to shadow relating to the obtained positional data of the light source. Alternatively, the method preferably further comprises, when obtaining the positional data of the light source, selecting from a plurality of data sets relating to shadow corresponding to preset light source positions, calculated and stored in advance for a specific element of the object, and expressed by displacement from a reference luminance a data set relating to shadow relating to the obtained positional data of the light source. Still further, the method preferably further comprises, when obtaining the positional data of the light source, selecting from a plurality of data sets relating to shadow corresponding to preset light source positions, calculated and stored in advance for a specific element of the object, and expressed by the luminance of at least one of the three primary colors a data set relating to shadow relating to the obtained positional data of the light source.

According to a third aspect of the present invention, there is provided a method of rendering an object in a virtual space, comprising converting an absolute direction of light from a light source in the virtual space or a relative direction between the object and the light to a position of a point in a shadow data set space comprised of points corresponding to preset directions of light and obtaining the position of the point in the shadow data set space as directional data of the light; selecting from a plurality of data sets relating to shadow corresponding to preset directions of light and calculated and stored in advance for a specific element of the object a data set relating to shadow relating to the obtained directional data of the light; interpolating from a plurality of data sets relating to shadow based on the obtained directional data of the light to generate an interpolated shadow data set when there are a plurality of data sets relating to shadow selected; and using the interpolated shadow data set to draw the object in the virtual space.

According to a fourth aspect of the present invention, there is provided a method of rendering an object in a virtual space, comprising designating a position of light from a light source in the virtual space; converting the designation to a position of a point in a shadow data set space comprised of points corresponding to preset light source directions and obtaining the position of the point in the shadow data set space as directional data of the light from the light source; selecting from a plurality of data sets relating to shadow corresponding to preset directions of light and calculated and stored in advance for a specific element of the object a data set relating to shadow relating to the obtained directional data of the light; interpolating from a plurality of data sets relating to shadow based on the obtained directional data of the light to generate an interpolated shadow data set when there are a plurality of data sets relating to shadow selected; and using the interpolated shadow data set to draw the object in the virtual space.

Note that when a light vector of the light source in the virtual space is designated, the light vector may be obtained as directional data.

Preferably, the method further comprises, when obtaining the directional data of the light, selecting from a plurality of data sets relating to a shadow corresponding to preset directions of light and calculated and stored in advance for a vertex of a polygon of the object or a surface of the object a data set relating to shadow relating to the obtained directional data of the light. Alternatively, the method preferably further comprises, when obtaining the directional data of the light, selecting from a plurality of data sets relating to a shadow corresponding to preset directions of light, calculated and stored in advance for a specific element of the object, and expressed by displacement from a reference luminance a data set relating to shadow relating to the obtained directional data of the light. Still further, the method further comprises, when obtaining the directional data of the light, selecting from a plurality of data sets relating to a shadow corresponding to preset directions of light, calculated and stored in advance for a specific element of the object, and expressed by the luminance of at least one of the three primary colors a data set relating to shadow relating to the obtained directional data of the light.

When one data set relating to a shadow is selected, the method may further comprise outputting the data set relating to shadow as an interpolated shadow data set.

According to a fifth aspect of the present invention, there is provided a computer readable program product storing a program for calculating data relating to shadow of an object in a virtual space, the program making the computer convert an absolute position of a light source in the virtual space or a relative position between the object and the light source to a position of a point in a shadow data set space comprised of points corresponding to preset light source positions and obtain the position of the point in the shadow data set space as positional data of the light source; select from a plurality of data sets relating to shadow corresponding to preset light source positions and calculated and stored in advance for a specific element of the object a data set relating to shadow relating to the obtained positional data of the light source; interpolate from a plurality of data sets relating to shadow based on the obtained positional data of the light source to generate an interpolated shadow data set when there are a plurality of data sets relating to shadow selected; and instruct use of the interpolated shadow data set to draw the object in the virtual space.

According to a sixth aspect of the present invention, there is provided a computer readable program product that stores a program for calculating data relating to a shadow of an object in a virtual space, the program making the computer designate a position of a light source in the virtual space; convert the designation to a position of a point in a shadow data set space comprised of points corresponding to preset light source positions and obtain the position of the point in the shadow data set space as positional data of the light source; select from a plurality of data sets relating to the shadow corresponding to preset light source positions and calculated and stored in advance for a specific element of the object a data set relating to the shadow relating to the obtained positional data of the light source; interpolate from a plurality of data sets relating to shadow based on the obtained positional data of the light source to generate an interpolated shadow data set when there are a plurality of data sets relating to shadow selected; and instruct use of the interpolated shadow data set to draw the object in the virtual space.

According to a seventh aspect of the present invention, there is provided a computer readable program product for storing a program that calculates data relating to a shadow of an object in a virtual space, the program making the computer convert an absolute direction of light from a light source in the virtual space or a relative direction between the object and the light to a position of a point in a shadow data set space comprised of points corresponding to preset directions of light and obtain the position of the point in the shadow data set space as directional data of the light; select from a plurality of data sets relating to shadow corresponding to preset directions of light and calculated and stored in advance for a specific element of the object a data set relating to shadow relating to the obtained directional data of the light; interpolate from a plurality of data sets relating to shadow based on the obtained directional data of the light to generate an interpolated shadow data set when there are a plurality of data sets relating to shadow selected; and instruct use of the interpolated shadow data set to draw the object in the virtual space.

According to an eighth aspect of the present invention, there is provided a computer readable program product for storing a program for calculating data relating to shadow of an object in a virtual space, the program making the computer designate a position of light from a light source in the virtual space; convert the designation to a position of a point in a shadow data set space comprised of points corresponding to preset light source directions and obtain the position of the point in the shadow data set space as directional data of the light from the light source; select from a plurality of data sets relating to shadow corresponding to preset directions of light and calculated and stored in advance for a specific element of the object a data set relating to shadow relating to the obtained directional data of the light; interpolate from a plurality of data sets relating to shadow based on the obtained directional data of the light to generate an interpolated shadow data set when there are a plurality of data sets relating to shadow selected; and instruct use of the interpolated shadow data set to draw the object in the virtual space.

According to a ninth aspect of the present invention, there is provided an apparatus for rendering an object in a virtual space, comprising a system that converts an absolute position of a light source in the virtual space or a relative position between the object and the light source to a position of a point in a shadow data set space comprised of points corresponding to preset light source positions and obtaining the position of the point in the shadow data set space as positional data of the light source; a selector that selects from a plurality of data sets relating to a shadow corresponding to preset light source positions and calculated and stored in advance for a specific element of the object a data set relating to shadow relating to the obtained positional data of the light source; a generator that interpolates from a plurality of data sets relating to a shadow based on the obtained positional data of the light source to generate an interpolated shadow data set when there are a plurality of data sets relating to shadow selected; and a system that uses the interpolated shadow data set to draw the object in the virtual space.

According to a 10th aspect of the present invention, there is provided an apparatus for rendering an object in a virtual space, comprising a system that designates a position of a light source in the virtual space; a system that converts the designation to a position of a point in a shadow data set space comprised of points corresponding to preset light source positions and obtaining the position of the point in the shadow data set space as positional data of the light source; a selector for selecting from a plurality of data sets relating to shadow corresponding to preset light source positions and calculated and stored in advance for a specific element of the object a data set relating to shadow relating to the obtained positional data of the light source; a generator for interpolating from a plurality of data sets relating to shadow based on the obtained positional data of the light source to generate an interpolated shadow data set when there are a plurality of data sets relating to shadow selected; and a system that uses the interpolated shadow data set to draw the object in the virtual space.

According to an 11th aspect of the present invention, there is provided an apparatus for rendering an object in a virtual space, comprising a system that converts an absolute direction of light from a light source in the virtual space or a relative direction between the object and the light to a position of a point in a shadow data set space comprised of points corresponding to preset directions of light and obtaining the position of the point in the shadow data set space as directional data of the light; a selector for selecting from a plurality of data sets relating to shadow corresponding to preset directions of light and calculated and stored in advance for a specific element of the object a data set relating to shadow relating to the obtained directional data of the light; a generator for interpolating from a plurality of data sets relating to shadow based on the obtained directional data of the light to generate an interpolated shadow data set when there are a plurality of data sets relating to shadow selected; and a system that uses the interpolated shadow data set to draw the object in the virtual space.

According to a 12th aspect of the present invention, there is provided an apparatus for rendering an object in a virtual space, comprising a system that designates a position of light from a light source in the virtual space; a system that converts the designation to a position of a point in a shadow data set space comprised of points corresponding to preset light source directions and obtaining the position of the point in the shadow data set space as directional data of the light from the light source; a selector for selecting from a plurality of data sets relating to shadow corresponding to preset directions of light and calculated and stored in advance for a specific element of the object a data set relating to shadow relating to the obtained directional data of the light; a generator for interpolating from a plurality of data sets relating to shadow based on the obtained directional data of the light to generate an interpolated shadow data set when there are a plurality of data sets relating to shadow selected; and a system that uses the interpolated shadow data set to draw the object in the virtual space.

According to a 13th aspect of the present invention, there is provided a game system for rendering an object in a virtual space, comprising a computer and a computer readable program product that stores a program for making a computer convert an absolute position of a light source in the virtual space or a relative position between the object and the light source to a position of a point in a shadow data set space comprised of points corresponding to preset light source positions, and obtain the position of the point in the shadow data set space as positional data of the light source, selecting from a plurality of data sets relating to shadow corresponding to preset light source positions and calculated and stored in advance for a specific element of the object a data set relating to shadow relating to the obtained positional data of the light source, interpolating from a plurality of data sets relating to shadow based on the obtained positional data of the light source to generate an interpolated shadow data set when there are a plurality of data sets relating to shadow selected, and instructing the use of the interpolated shadow data set to draw the object in the virtual space.

According to a 14th aspect of the present invention, there is provided a game system for rendering an object in a virtual space, comprising a computer and a computer readable program product that stores a program for making the computer designate a position of a light source in the virtual space, converting the designation to a position of a point in a shadow data set space comprised of points corresponding to preset light source positions and obtaining the position of the point in the shadow data set space as positional data of the light source, selecting from a plurality of data sets relating to shadow corresponding to preset light source positions and calculated and stored in advance for a specific element of the object a data set relating to shadow relating to the obtained positional data of the light source, interpolating from a plurality of data sets relating to shadow based on the obtained positional data of the light source to generate an interpolated shadow data set when there are a plurality of data sets relating to shadow selected, and instructing the use of the interpolated shadow data set to draw the object in the virtual space.

According to a 15th aspect of the present invention, there is provided a game system for rendering an object in a virtual space, comprising a computer and a computer readable program product that stores a program for making the computer convert an absolute direction of light from a light source in the virtual space or a relative direction between the object and the light to a position of a point in a shadow data set space comprised of points corresponding to preset directions of light and obtaining the position of the point in the shadow data set space as directional data of the light, selecting from a plurality of data sets relating to shadow corresponding to preset directions of light and calculated and stored in advance for a specific element of the object a data set relating to shadow relating to the obtained directional data of the light, interpolating from a plurality of data sets relating to shadow based on the obtained directional data of the light to generate an interpolated shadow data set when there are a plurality of data sets relating to shadow selected, and instructing the use of the interpolated shadow data set to draw the object in the virtual space.

According to a 16th aspect of the present invention, there is provided a game system for rendering an object in a virtual space, comprising a computer and a computer readable program product that stores a program for making the computer designate a position of light from a light source in the virtual space, processing for converting the designation to a position of a point in a shadow data set space comprised of points corresponding to preset light source directions and obtaining the position of the point in the shadow data set space as directional data of the light from the light source, selecting from a plurality of data sets relating to shadow corresponding to preset directions of light and calculated and stored in advance for a specific element of the object a data set relating to shadow relating to the obtained directional data of the light, interpolating from a plurality of data sets relating to shadow based on the obtained directional data of the light to generate an interpolated shadow data set when there are a plurality of data sets relating to shadow selected, and instructing the use of the interpolated shadow data set to draw the object in the virtual space.

According to a 17th aspect of the present invention, there is provided a method of rendering an object in a virtual space, comprising receiving input from at least one of an operator and a program for changing a position of a light source arranged in the virtual space, a position of the object, or a position of the light source and the position of the object; obtaining from the input received data of an absolute position of the light source or data of a relative position of the light source with respect to the object; selecting from a plurality of data sets relating to shadow corresponding to preset light source positions and calculated and stored in advance for a specific element of the object a data set relating to shadow relating to the obtained data of the absolute position of the light source or data of the relative position of the light source; interpolating from a plurality of data sets relating to shadow based on the obtained data of the absolute position of the light source or data of the relative position of the light source to generate an interpolated shadow data set when there are a plurality of data sets relating to shadow selected; and using the interpolated shadow data set to draw the object in the virtual space.

According to an 18th aspect of the present invention, there is provided a method of rendering an object in a virtual space, comprising receiving input from at least one of an operator and a program for changing a direction of light of a light source arranged in the virtual space, a position of the object, or the direction of light of the light source and the position of the object; obtaining from the input received data of an absolute direction of the light or data of a relative direction of the light with respect to the object; selecting from a plurality of data sets relating to shadow corresponding to preset directions of light and calculated and stored in advance for a specific element of the object a data set relating to shadow relating to the obtained data of the absolute position of the light or data of the relative position of the light; interpolating from a plurality of data sets relating to shadow based on the obtained data of the absolute direction of the light or data of the relative direction of the light to generate an interpolated shadow data set when there are a plurality of data sets relating to shadow selected; and using the interpolated shadow data set to draw the object in the virtual space.

According to a 19th aspect of the present invention, there is provided a computer readable program product that stores a program for calculating data relating to shadow of an object in a virtual space, the program making the computer receive input from at least one of an operator and a program for changing a position of a light source arranged in the virtual space, a position of the object, or a position of the light source and the position of the object; obtain from the input received data of an absolute position of the light source or data of a relative position of the light source with respect to the object; select from a plurality of data sets relating to shadow corresponding to preset light source positions and calculated and stored in advance for a specific element of the object a data set relating to shadow relating to the obtained data of the absolute position of the light source or data of the relative position of the light source; interpolate from a plurality of data sets relating to shadow based on the obtained data of the absolute position of the light source or data of the relative position of the light source to generate an interpolated shadow data set when there are a plurality of data sets relating to shadow selected; and instruct use of the interpolated shadow data set to draw the object in the virtual space.

According to a 20th aspect of the present invention, there is provided a computer readable program product that stores a program for calculating data relating to a shadow of an object in a virtual space, the program making the computer receive input from at least one of an operator and a program for changing a direction of light of a light source arranged in the virtual space, a position of the object, or the direction of light of the light source and the position of the object; obtain from the input received data of an absolute direction of the light or data of a relative direction of the light with respect to the object; select from a plurality of data sets relating to the shadow corresponding to preset directions of light and calculated and stored in advance for a specific element of the object a data set relating to the shadow relating to the obtained data of the absolute position of the light or data of the relative position of the light; interpolate from a plurality of data sets relating to the shadow based on the obtained data of the absolute direction of the light or data of the relative direction of the light to generate an interpolated shadow data set when there are a plurality of data sets relating to shadow selected; and instruct use of the interpolated shadow data set to draw the object in the virtual space.

According to a 21st aspect of the present invention, there is provided an apparatus for rendering an object in a virtual space, comprising a system that receives an input from at least one of an operator and a program for changing a position of a light source arranged in the virtual space, a position of the object, or a position of the light source and the position of the object; a system that obtains, from the input received, data of an absolute position of the light source or data of a relative position of the light source with respect to the object; a selector that selects from a plurality of data sets relating to a shadow corresponding to preset light source positions and calculated and stored in advance for a specific element of the object a data set relating to shadow relating to the obtained data of the absolute position of the light source or data of the relative position of the light source; a generator that interpolates from a plurality of data sets relating to the shadow based on the obtained data of the absolute position of the light source or data of the relative position of the light source to generate an interpolated shadow data set when there are a plurality of data sets relating to the selected shadow; and a system that uses the interpolated shadow data set to draw the object in the virtual space.

According to a 22nd aspect of the present invention, there is provided an apparatus for rendering an object in a virtual space, comprising a system that receives an input from at least one of an operator and a program for changing a direction of light of a light source arranged in the virtual space, a position of the object, or the direction of light of the light source and the position of the object; a system that obtains, from the input received, data of an absolute direction of the light or data of a relative direction of the light with respect to the object; a selector for selecting from a plurality of data sets relating to a shadow corresponding to preset directions of light and calculated and stored in advance for a specific element of the object a data set relating to shadow relating to the obtained data of the absolute position of the light or data of the relative position of the light; a generator for interpolating from a plurality of data sets relating to shadow based on the obtained data of the absolute direction of the light or data of the relative direction of the light to generate an interpolated shadow data set when there are a plurality of data sets relating to the selected shadow; and a system that uses the interpolated shadow data set to draw the object in the virtual space.

According to a 23rd aspect of the present invention, there is provided a game system for rendering an object in a virtual space, comprising a computer and a computer readable program product that stores a program for making the computer receive input from at least one of an operator and a program for changing a position of a light source arranged in the virtual space, a position of the object, or a position of the light source and the position of the object, obtain from the input received data of an absolute position of the light source or data of a relative position of the light source with respect to the object, select from a plurality of data sets relating to shadow corresponding to preset light source positions and calculated and stored in advance for a specific element of the object a data set relating to a shadow relating to the obtained data of the absolute position of the light source or data of the relative position of the light source, interpolate from a plurality of data sets relating to shadow based on the obtained data of the absolute position of the light source or data of the relative position of the light source to generate an interpolated shadow data set when there are a plurality of data sets relating to shadow selected, and using the interpolated shadow data set to draw the object in the virtual space.

According to a 24th aspect of the present invention, there is provided a game system for rendering an object in a virtual space, comprising a computer and a computer readable program that stores a program for making a computer execute processing for receiving input from at least one of an operator and a program for changing a direction of light of a light source arranged in the virtual space, a position of the object, or the direction of light of the light source and the position of the object, obtaining from the input received data of an absolute direction of the light or data of a relative direction of the light with respect to the object, selecting from a plurality of data sets relating to shadow corresponding to preset directions of light and calculated and stored in advance for a specific element of the object a data set relating to shadow relating to the obtained data of the absolute position of the light or data of the relative position of the light, interpolating from a plurality of data sets relating to shadow based on the obtained data of the absolute direction of the light or data of the relative direction of the light to generate an interpolated shadow data set when there are a plurality of data sets relating to the selected shadow, and using the interpolated shadow data set to draw the object in the virtual space.

The present disclosure relates to subject matter contained in Japanese Pat. Application No. HEI 11-195214, filed on Jul. 9, 1999, the disclosure of which is expressly incorporated herein by reference in its entirety.

BRIEF DESCRIPTION OF THE DRAWINGS

These and other objects and features of the present invention will become clearer from the following description of the preferred embodiments given with reference to the attached drawings, in which:

FIG. 6 is a schematic view of an example of a shadow data matrix for storing a shadow data set;

FIG. 14A is a schematic view of the indirect designation of the position of a light source or the direction of light emitted from a light source;

FIG. 14B is a schematic view for explaining mapping in the shadow data set space;

DESCRIPTION OF THE PREFERRED EMBODIMENTS

Figure 1:
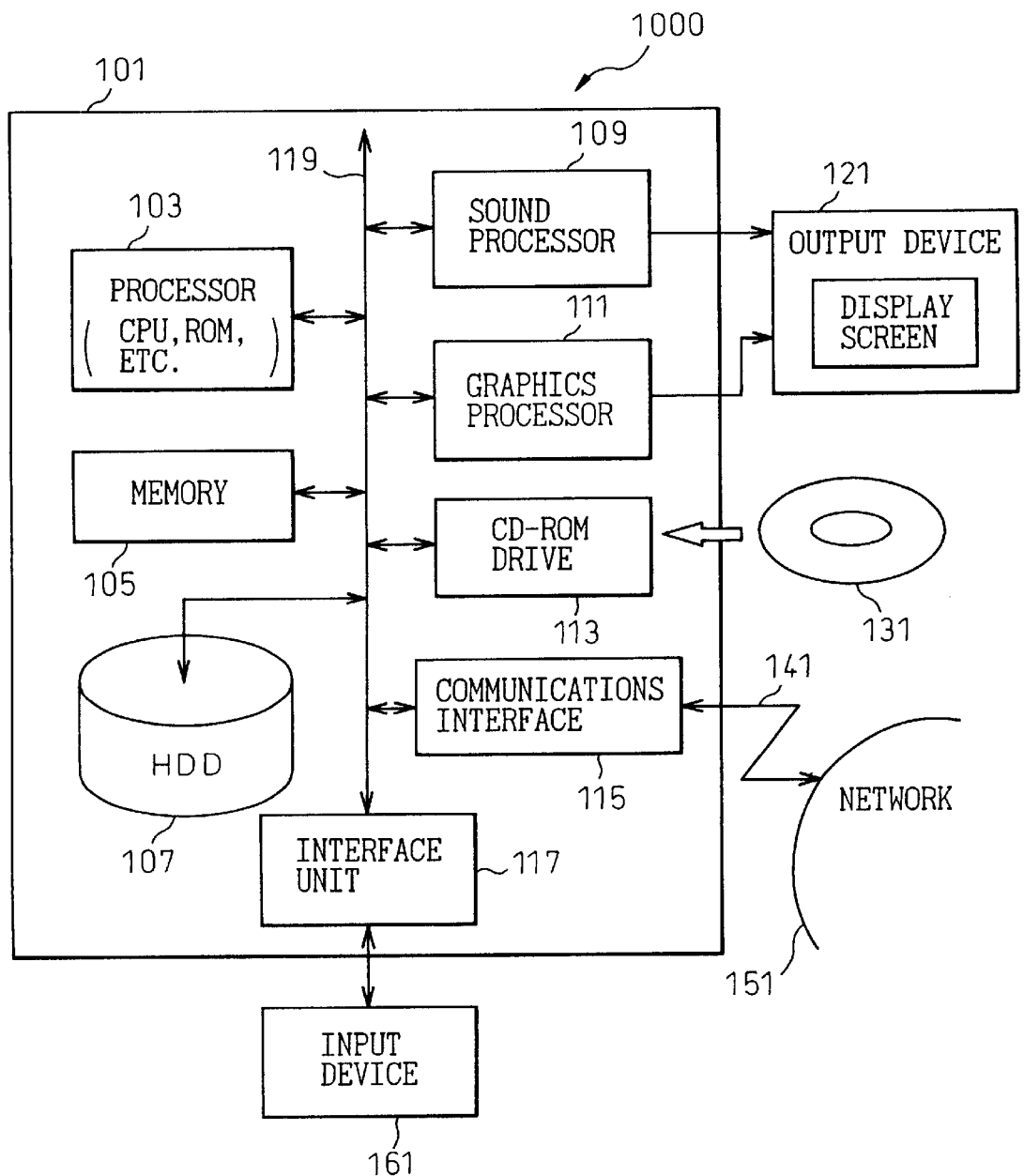
FIG. 1 is a block diagram of an example of a computer for executing a program according to the present invention.

First, an example of a computer 10000 for executing a computer program when working the present invention by such a computer program. The computer 1000 includes a computer unit 101. The computer unit 101 includes a processor 103, memory 105, a hard disk drive HDD 107, a sound processor 109, a graphics processor 111, a CD-ROM drive 113, a communications interface 115, and an interface unit 117 connected by an internal bus 119. The sound processor 109 and graphics processor 111 of the computer unit 101 are connected to an output device 121. The output device 121 is, for example, a display device including a sound output device and a display screen. Further, the CD-ROM drive 113 can be loaded with a CD-ROM 131. The communications interface 115 is connected with a network 151 through a communications medium 141. An input device 161 is connected to the interface unit 117.

The processor 103 includes a CPU, ROM, etc. and executes a program stored in the HDD 107 or CD-ROM 131 to control the computer 1000. The memory 105 is a work area of the processor 103. The HDD 107 is a storage area for storing the program or data. The sound processor 109 analyzes an instruction of the program executed by the processor 103 to output sound and outputs a sound signal to the output device 121. The graphics processor 111 outputs a signal for display on the display screen of the output device 121 in accordance with a drawing instruction output from the processor 103. The CD-ROM drive 113 reads the program and data of the CD-ROM 131. The communications interface 115 connects to the network 151 through the communications medium 141 to communicate with another computer etc. The interface unit 117 outputs an input from the input device 161 to the memory 105. The processor 103 analyzes this and executes the computations.

The program and data according to the present invention are first stored for example in the CD-ROM 131. The program and data are read from the CD-ROM 113 drive and loaded into the memory 105 at the time of execution. The processor 103 processes the program and data according to the present invention loaded into the memory 105 and outputs the drawing instruction to the graphics processor 111. Note that intermediate data is stored in the memory 105. The graphics processor 111 performs processing in accordance with the drawing instruction from the processor 103 and outputs a signal for display on the display screen of the output device 121.

First Embodiment

Figure 2:
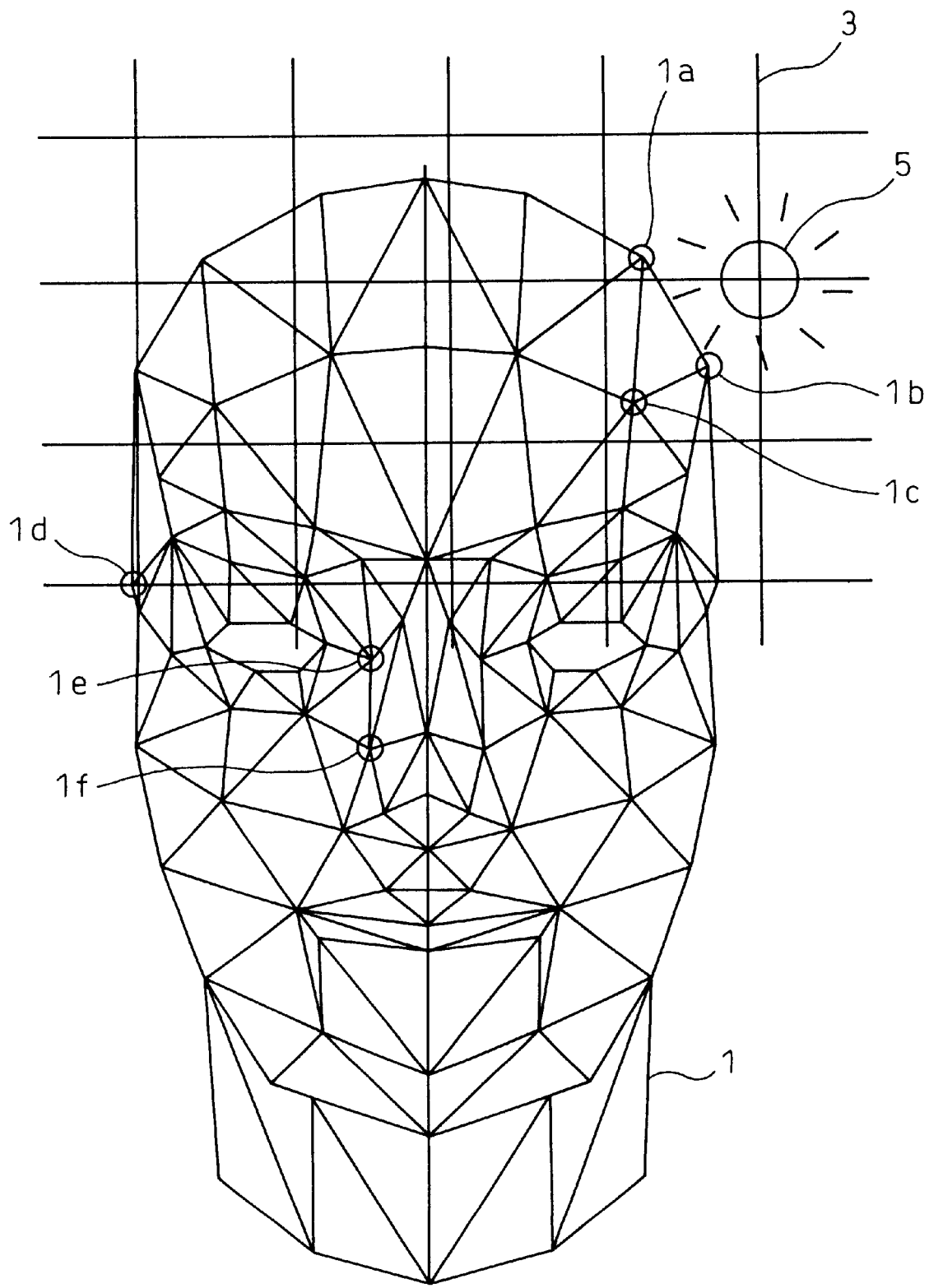
FIG. 2 is a schematic view for explaining the positional relationship between the object expressing the face of a person and a light source.
Figure 3:
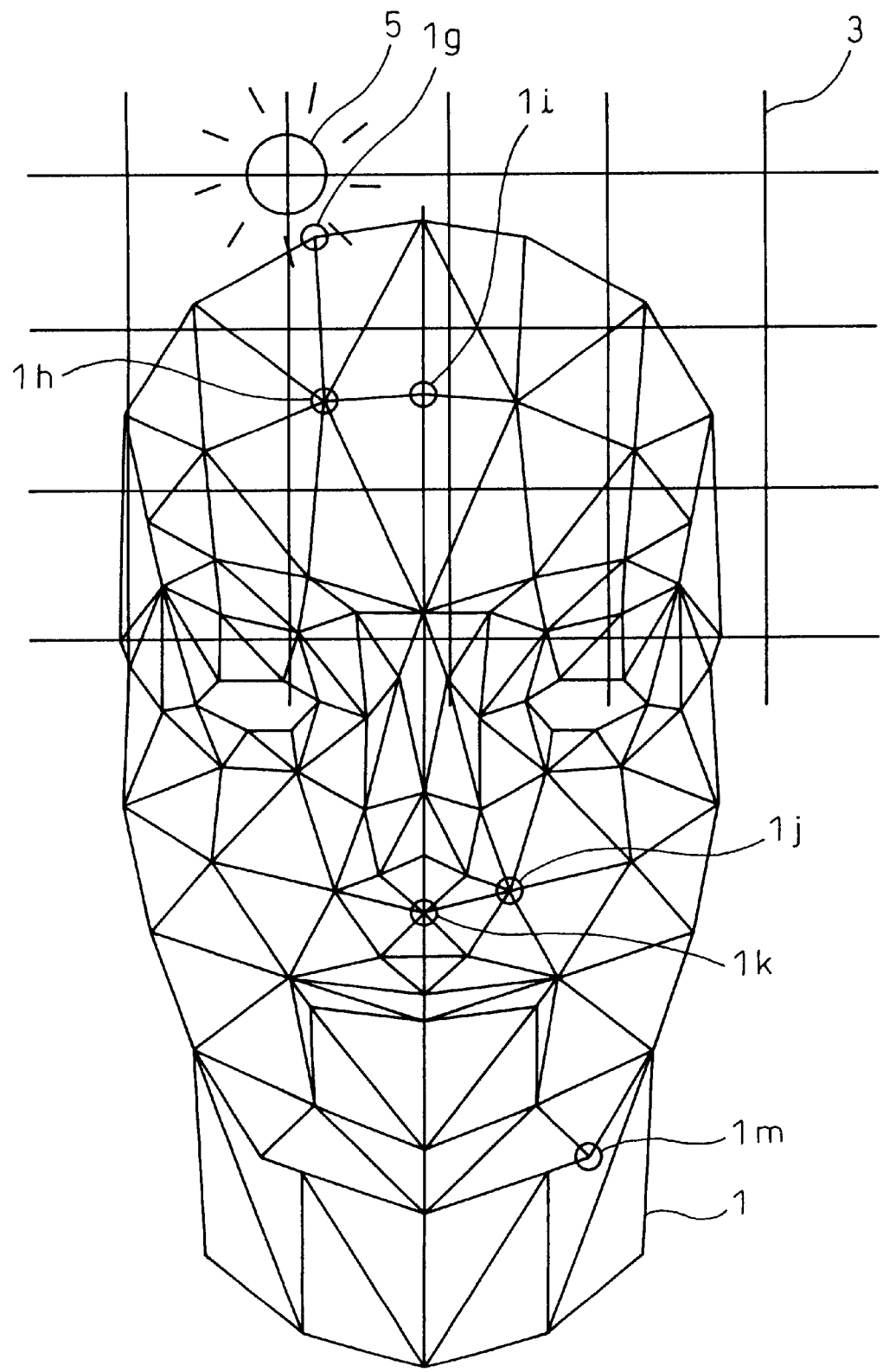
FIG. 3 is a schematic view for explaining the positional relationship between the object expressing the face of a person and a light source.

First, the processing of the first embodiment will be explained in brief. Consider for example the case of rendering a scene in which an object expressing the face of a person such as in FIG. 2 is irradiated by light from a light source 5. When the light source 5 is arranged at the right as shown in FIG. 2, the vertexes 1a, 1b, and 1c close to the light source 5 (toward the right) among the vertexes of the polygons comprising the object 1 expressing the face of the person become brighter, while the vertexes 1d, 1e, and 1f of the polygons toward the face become darker since a shadow is cast due to the "nose" etc. of the object 1 expressing the face of the person. On the other hand, when the light source 5 is arranged above as shown in FIG. 3, the vertexes 1g, 1h, and 1i of the polygons of the "head" portion of the object 1 expressing the person become brighter, while the vertexes 1j, 1k, and 1m of the polygons below the "nose" and of the "chin" portion of the object 1 expressing the face of the person become darker. If the position of the light source is changed in this way, the shadows at the vertexes of the polygons change even in the object to be rendered (object 1 expressing face of person in FIG. 2 and FIG. 3), so inherently, when changing the position of a light source, it is necessary to calculate the light each time. The present invention reduces the cost of calculation of shadow data during rendering. For example, in the case of FIG. 2 and FIG. 3, the range in which the light source can be arranged is shown and lighting is calculated in advance for cases of arranging the light source at different lattice points of a lattice 3 provided in front of the object 1 expressing the face of a person. The shadow data of the vertexes of the object 1 expressing the face of a person (the total shadow data corresponding to one lattice point being called a "shadow data set") is stored in a storage device (for example, the HDD 107 of FIG. 1) or a storage medium (for example, the CD-ROM 131 of FIG. 1). At the time of rendering, a plurality of lattice points near the set position of the light source 5 are found, the plurality of shadow data sets corresponding to the plurality of lattice points are interpolated, and the shadow data set of the set position of the light source 5 (called the interpolated shadow data set) is generated. The interpolated shadow data set is, for example, stored in the memory 105 of FIG. 1. This interpolated shadow data set is used for the rendering. Note that the position of a lattice point will be called a reference position of the light source.

The lighting calculation performed in advance includes the following processing: (1) The light source is arranged at one reference position and ray tracing or another algorithm is used for rendering the object. At that time, the color of the vertexes of the polygons included in the object is set to between white and black. (2) It is investigated at which pixel positions of the two-dimensional bit map on the screen, generated as a result of the rendering, the vertexes of the polygons have been transformed in perspective. (3) The brightness is calculated from the color of corresponding pixels for vertexes of polygons where the corresponding pixels were present in the two-dimensional bit map. (4) The difference in brightness before and after rendering is calculated for each vertex of a polygon. The difference in brightness is the shadow data of the vertex. For example, if there is no difference before and after rendering, the value is 0. If it is brighter, a positive number corresponding to that extent (1 to 127 if providing 1 byte of memory per vertex) is assigned, while if it is darker, a negative number corresponding to that extent (−1 to −128 in a similar case) is assigned. (5) In the above processing, since the vertexes of polygons at the rear of the perspective are not in the two-dimensional bit map, the perspective is moved until the vertexes of the necessary polygons are included in the two-dimensional bit map and steps (1) to (4) are repeated. At this time, the light source is not allowed to move. If calculating the shadow data for the vertexes of the necessary polygons, the calculation of lighting for the reference position ends. (6) The processing from (1) to (5) is executed for all reference positions. Note that the "vertexes of the necessary polygons" are normally the vertexes of the entire object. It is also possible to limit this to a predetermined range, however.

Figure 4:
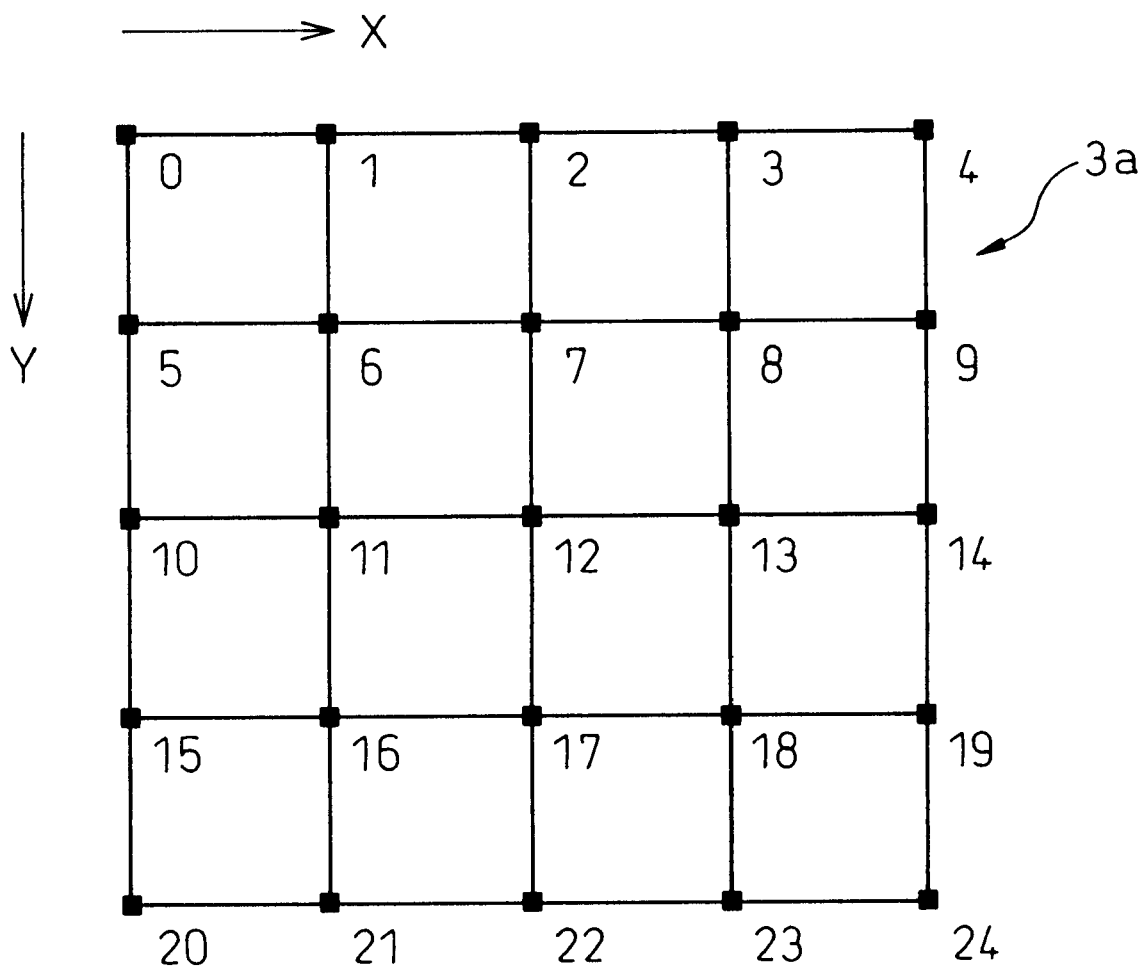
FIG. 4 is a schematic view for explaining a shadow data set space.
Figure 5:
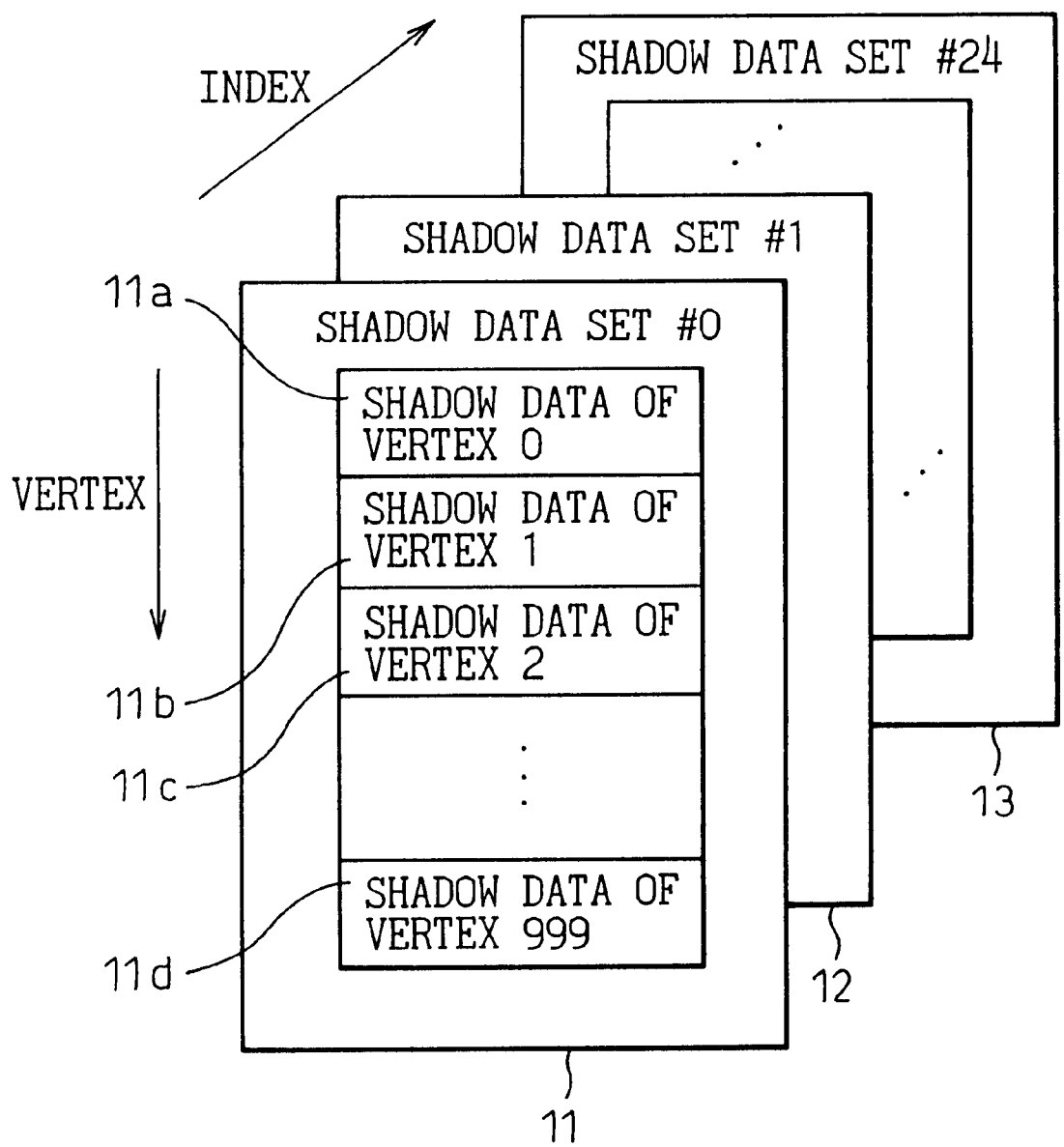
FIG. 5 is a conceptual view of a shadow data set.

Next, a shadow data set will be explained. Consider the case where the lattice 3 shown in FIG. 2 and FIG. 3 is a lattice 3a having 25 lattice points as shown for example in FIG. 4. In this lattice 3a, an index is assigned to each lattice point as shown in FIG. 4. The horizontal direction is defined as the x-axis, while the vertical downward direction is defined as the y-axis. The shadow data set is calculated for each lattice point. Therefore, the data as shown in FIG. 5 is calculated in advance. That is, the "#0#" shadow data set 11 corresponding to the index 0 includes the shadow data 11a, 11b, 11c, and 11d from the vertex 0 to the vertex 999 (example of 1000 vertexes of object), the "#1#" shadow data set 12 corresponding to the index 1 includes the shadow data from the vertex 0 to the vertex 999, and similarly on down until the "#24#" shadow data set 11 corresponding to the index 24 includes the shadow data from the vertex 0 to the vertex 999. When actually storing the shadow data sets in a storage device (for example, the HDD 107 of FIG. 1) or a storage medium (for example, the CD-ROM 131), they are sometimes stored by a data structure as with the shadow data matrix 20 shown in FIG. 6. In FIG. 6, the vertexes (here, it is generally assumed that there are N number of vertexes) are arranged in the vertical direction, while the indexes (it is more generally assumed there are M number of reference positions) are arranged in the horizontal direction. Therefore, in the data structure of FIG. 6, one column gives one shadow data set. Note that the vertical and horizontal arrangements can be switched.

Figure 7:
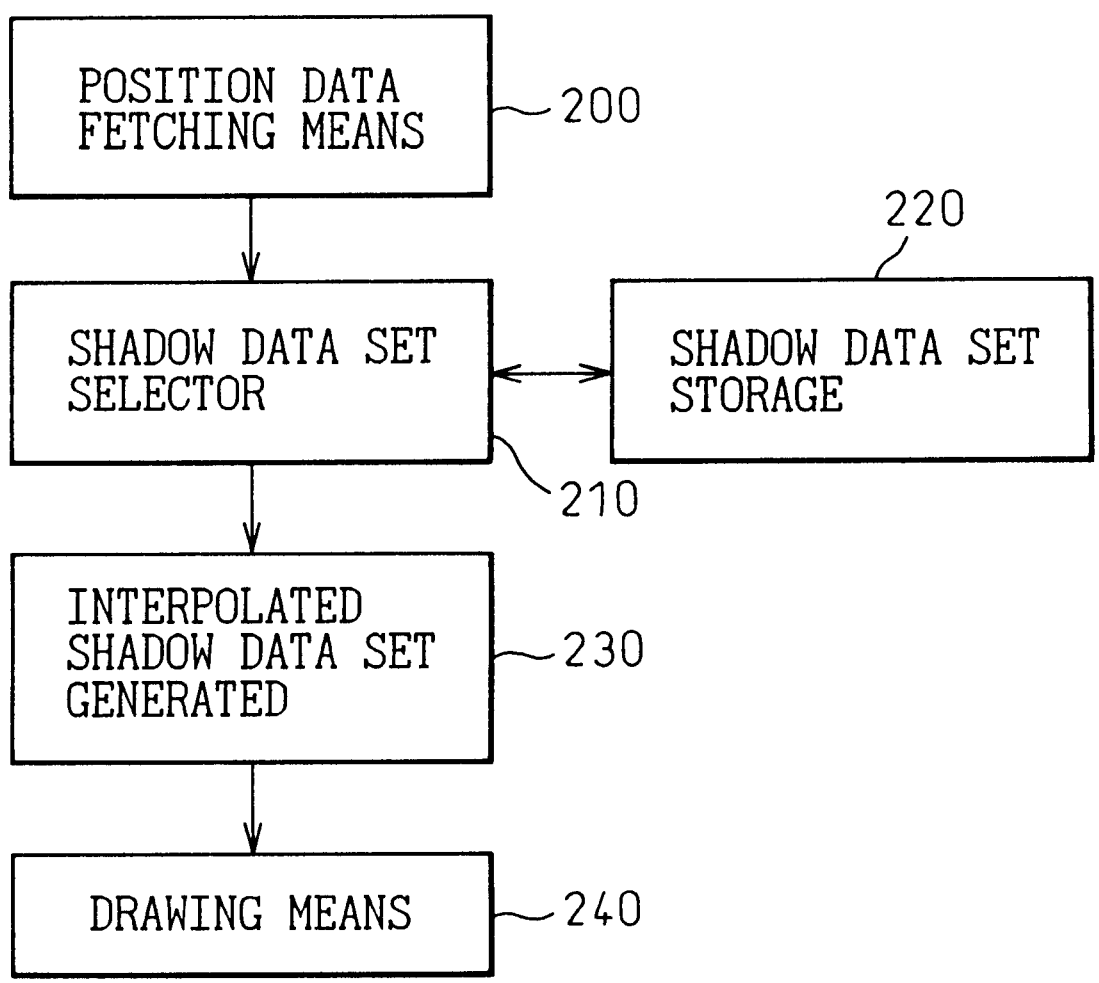
FIG. 7 is a functional block diagram relating to the first embodiment.

Here, a functional block diagram of the first embodiment is given in FIG. 7. In the first embodiment, four functions are necessary, that is, the positional data acquiring means 200, the shadow data set selector 210, the interpolated shadow data set generator 230, and the drawing means 240. Note that a shadow data set storage device 220 for storing the shadow data set of each reference position of the light source is also used. First, the positional data acquiring means 200 acquires data relating to the position of the light source. That is, the positional data, from a program other than the program relating to the first embodiment or, for example, the input device 161 of FIG. 1 operated by the operator. The positional data acquiring means 200 outputs the acquired positional data to the shadow data set selector 210. The shadow data set selector 210 selects the shadow data set used for generation of an interpolated shadow data set from the acquired positional data and fetches the selected shadow data set from the shadow data set storage device 220. The shadow data set selector 210 outputs the selected and fetched shadow data set to the interpolated shadow data set generator 230. The interpolated shadow data set generator 230 interpolates from the received shadow data set to generate the interpolated shadow data set corresponding to the acquired positional data. Further, the interpolated shadow data set generator 230 outputs the thus generated interpolated shadow data set and drawing instructions to the drawing means 240. The drawing means 240 processes the interpolated shadow data set in accordance with the drawing instructions to draw the object in the virtual space. The drawing means 240 corresponds, for example, to the graphics processor 111 of FIG. 1 and includes a triangle generator, explained later in the first embodiment.

After the above lighting calculation is performed and the shadow data set is stored in the storage device (for example, the HDD 107 of FIG. 1) or the storage medium (for example, the CD-ROM 131 of FIG. 1), the following processing is performed.

(1) Overall Flow of Processing

Figure 8:
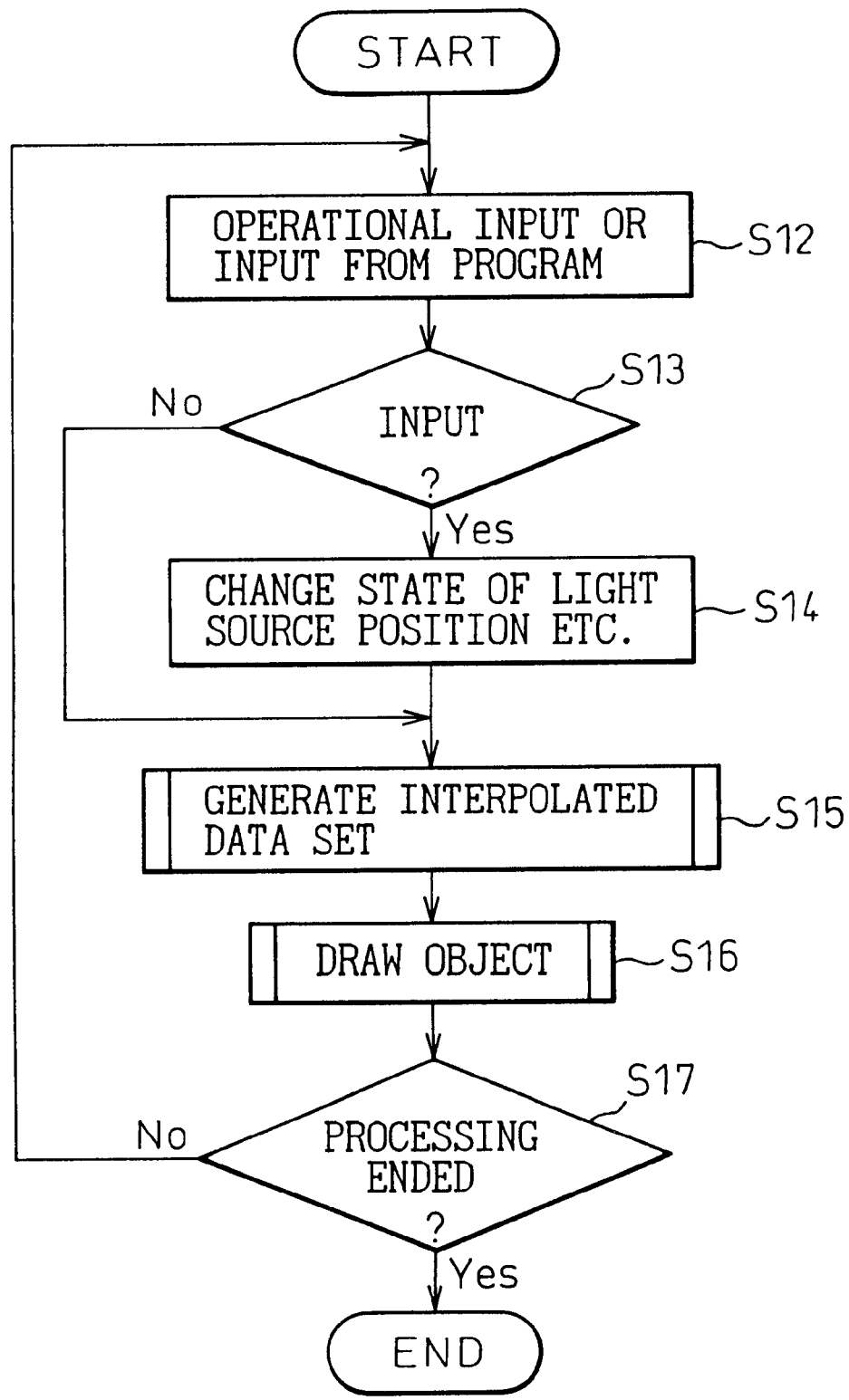
FIG. 8 is a flow chart of the overall processing of the present invention.

FIG. 8 shows the overall flow of processing. First, an operational input by an operator or an input from a program other than the program according to the present invention is received (step S12). The operational input from the operator is input from, for example, the input device 161 of FIG. 1. This input is, for example, input relating to designation or change of the position of the perspective, designation or change of the position of the light source, movement of the object to be rendered, etc. Next, it is determined whether there is any input (step S13). If there is an input, the position of the perspective, the position of the light source, the position of the object, or other states are changed in accordance with the input (step S14). If there is no input, the routine proceeds from step S12 to step S15. Next, the processing for generation of an interpolated shadow data set according to the present invention is executed based on the position of the light source at the present time (step S15). This processing will be explained in further detail below. When an interpolated shadow data set is generated, this information is used for drawing the object (step S16). This processing will also be explained later. An object in the virtual space is displayed on the display device in this way. It is then determined whether the processing has ended (step S17). If the processing has ended, the processing shown in FIG. 8 is ended. If the processing has not ended, the routine returns to step S12. Due to this, the processing from step S12 to step S16 is repeated until the end of the processing.

(2) Processing for Generating Interpolated Shadow Data Set

Next, the processing for generation of an interpolated shadow data set, the main part of the present invention, will be explained using FIG. 9. First, the positional data X and Y of the light source is acquired from the input received at step S12 of FIG. 8 (X and Y being numerals expressing the coordinates of the light source) (step S23). Note that the light source is made able to be arranged on a predetermined plane or curved surface. The coordinates on the plane or curved surface are input at step S12 of FIG. 8.

Next, the weight values wx and wy of X and Y, used in the interpolation, are calculated (step S25) (wx and wy being numerals from 0 to less than 1). The "index" is the number of the reference position of the light source. The shadow data set may be identified from this index. Note that four reference positions near the coordinates (X,Y) are selected. Further, it is judged if the processing of step S31 and step S33 has been executed for all the vertexes of the object (step S29). If the processing has been performed for all vertexes, the routine ends, and processing proceeds to step S16 of FIG. 8. If not, the routine proceeds to step S31. Due to this, the following processing is repeated until the processing of all of the predetermined vertexes of an object is completed. That is, the shadow data of one vertex is fetched from the shadow data sets corresponding to the four indexes and the weight value wx used for interpolation in the x-direction (step S31). When using the weight value w for linear interpolation of the value of P (P is a real number) and the value of Q (Q is a real number), the interpolation formula becomes as follows:

$$PQ = P \times (1-w) + Q \times w = (Q-P) \times w + P \quad (1)$$

Figure 10:
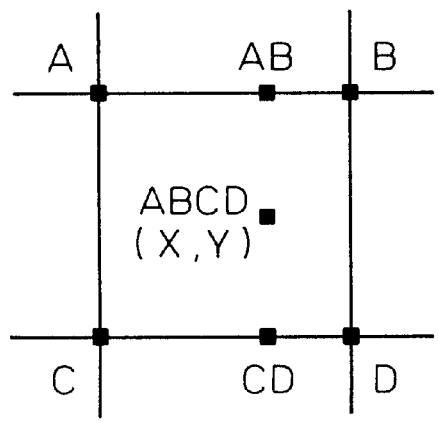
FIG. 10 is a schematic view for explaining an example of interpolation.

Therefore, for example, as shown in FIG. 10, when there is (X,Y) and the shadow data of the vertexes at the four reference positions corresponding to the four indexes are A, B, C, and D (A, B, C, and D being real numbers), the linear interpolation of A and B is $$AB = (B-A) \times wx + A \quad (2)$$

and the linear interpolation of C and D is $$CD = (D-C) \times wx + C \quad (3)$$

Similarly, the result of interpolation in the X-direction is interpolated for the Y-direction using the weight value wy (step S33). In the example of FIG. 10, if the value of AB and the value of CD are linearly interpolated by the weight value WY, the result is:

$$ABCD=(CD-AB)\times wy+AB \quad (4)$$

The result of interpolation ABCD is stored as the shadow data of the vertex in the shadow buffer (for example, memory 105 of FIG. 1).

Next, a specific example will be explained. First, it is assumed that the input at step S12 of FIG. 8 is the coordinates (X,Y) on the plane as shown in FIG. 4. Here, the origin of FIG. 4 is made the index 0 and the vertical and horizontal distance between lattice points is made 10. Here, when the coordinates (25,12) are input as the position of the light source at step S12 in FIG. 8, at step S23 in FIG. 9, the (25,12) are fetched as they are. The weight wx is the number after the decimal point of 25/10, that is, wx=0.5. Similarly, the weight value wy is the number after the decimal point of 12/10, that is, wy=0.2 (step S25 in FIG. 9). Next, the four indexes are found. Before this, however, the value x1 obtained by raising the value x0 obtained dividing X by 10, then discarding the numbers after the decimal point and the value y1 obtained by raising the value y0 obtained dividing Y by 10, then discarding the numbers after the decimal point are calculated. In this example, x0=2, x1=3, y0=1, and y1=2. The indexes become as follows using index=y×5+x:

$$a=y0\times5+x0=7$$
$$b=y0\times5+x1=8$$
$$c=y1\times5+x0=12$$
$$d=y1\times5+x0=13 \quad (7)$$

Figure 9:
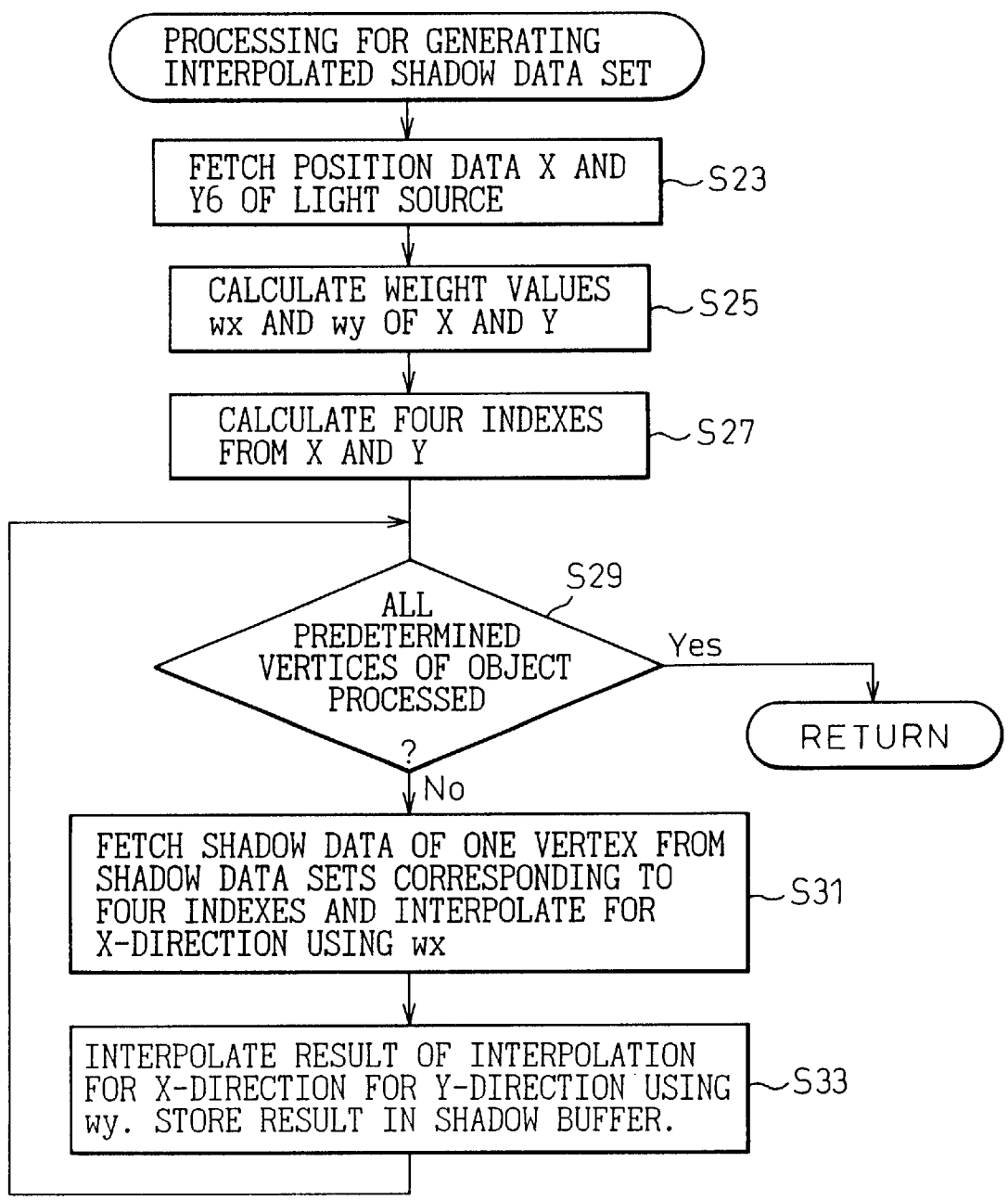
FIG. 9 is a flow chart of the processing for generating an interpolated shadow data set in FIG. 8.
Figure 11:
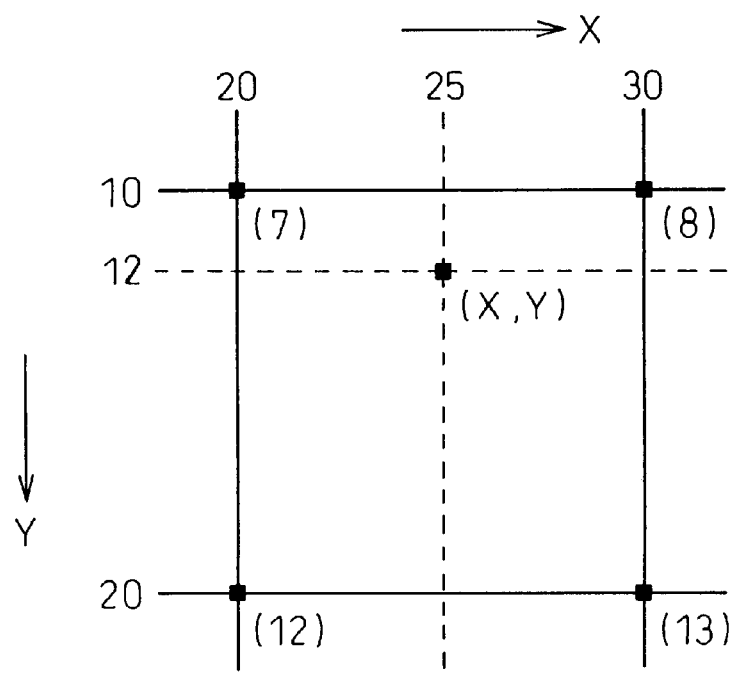
FIG. 11 is a schematic view for explaining an example of interpolation.

Due to this, it is learned that the lattice points near (25,12) are the indexes 7, 8, 12, and 13 (step S27 of FIG. 9). The information learned up to here is shown in FIG. 11. FIG. 11 shows part of FIG. 4. In FIG. 11, the indexes are shown in parentheses. The other numbers are the coordinates. The coordinates of the index 7 are (20, 10), the coordinates of the index 8 are (30,10), the coordinates of the index 12 are (20,20), and the coordinates of the index 13 are (30,20). Here, assuming use of the shadow data matrix as shown in FIG. 6, the shadow data A of the vertex n of the index 7, the shadow data B of the vertex n of the index 8, the shadow data C of the vertex n of the index 12, and the shadow data D of the vertex n of the index 13 may be fetched as follows:

A=shadow data matrix [a][n]
B=shadow data matrix [b][n]
C=shadow data matrix [c][n]
D=shadow data matrix [d][n] (6)

By using the A, B, C, and D and the wx and wy, interpolation is possible by the above interpolation formula.

Figure 15:
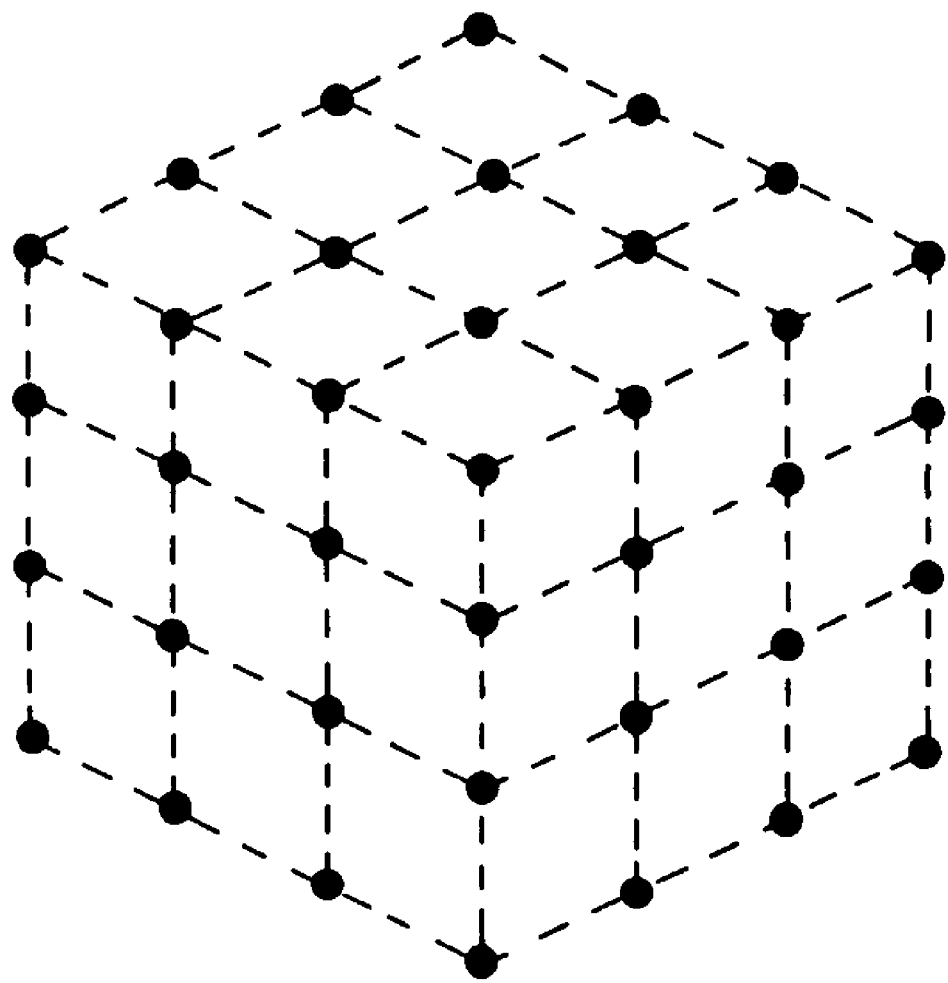
FIG. 15 is a schematic view of an example of a shadow data set space when designating the position of the light source as a position in the three-dimensional space or when designating the direction of the light emitted from the light source as a vector.

Note that in the above example, the range in which the light source can be arranged was limited to a plane or curved surface, but in principle it may be arranged in a predetermined three-dimensional space. In this case, it is necessary to prepare a three-dimensional lattice such as shown in FIG. 15 instead of the two-dimensional lattice such as shown in FIG. 4. It is naturally necessary to calculate the shadow data set at the increased lattice points in advance. In addition, the weight value wz is calculated and eight indexes instead of four indexes are selected. Similarly, the interpolation must be performed not only for the X- and Y-directions, but also the Z-direction. Conversely, the range in which the light source can be arranged may be limited to a straight line or curve. In this case, the lattice shown in FIG. 4 may be one dimensional. Further, the number of shadow data sets may also be for one dimension. The weight value wy is unnecessary. Two indexes are selected. Similarly, the interpolation may be performed in only the X-direction.

(3) Processing for Drawing Object

Next, the processing of step S16 of FIG. 8 will be explained using FIG. 12. First, it is judged if the processing of step S45 to step S51 has been executed for all vertexes of the object (step S43). If the processing is performed for all the vertexes, the routine ends and processing proceeds to step S17 of FIG. 8. If not, the routine proceeds to step S43. Due to this, the processing from step S45 to step S51 is repeated until the processing has been performed for all vertexes of the object (step S43). First, the vertex coordinates of one vertex are converted to coordinates in a screen coordinate system (step S45). This is called perspective transformation. Further, the shadow data of the vertex is read from the shadow buffer (for example, the memory 105 of FIG. 1) storing the interpolated shadow data sets (step S47). Note that the shadow data was displaced from a predetermined reference luminance in the above explanation, but here the displacement is converted to a value α(α is a positive real number) in a range which the color components can take and (R,G,B) with these entered for the color components, that is, (α,α,α) is used as the shadow data. Next, the texture coordinates of the vertex is calculated (step S49). When performing texture mapping, the texture coordinates (U,V) (U and V are real numbers) are already designated for the vertexes of the polygons, but when a polygon is arranged at a slant with respect to the screen, the texture is sometimes displayed distorted on the screen. To avoid this distortion, as the texture perspective processing, here, Q=1/d (Q is a real number and d is a real number showing the depth from the screen) is used and S=U×Q and T=V×Q are calculated. Up to here, the coordinates in the screen coordinate system, the texture coordinates, and the shadow data are prepared for a vertex. This information is input and the triangle generator (for example, provided in the graphics processor 111 of FIG. 1) is driven (step S51). The triangle generator performs the following processing for each pixel in the polygon of the object. That is, (1) the texture coordinates (S,T) at the vertexes constituting the polygon are interpolated to find the texture coordinates at the pixel and texel color data is obtained from the texture coordinates. Further, (2) the shadow data at the vertexes constituting the polygon are interpolated to find the shadow data at the pixel. Further, (3) the color data at the pixel is generated from the texel color data and shadow data.

In this way, in the first embodiment, the explanation was made of the processing in the case where the position of the light source, in particular the absolute position of the light source, is input. Due to the first embodiment, even when changing the position of the light source, it becomes possible to calculate the shadow data at each vertex of a polygon of an object at a high speed without lighting calculation at the time of rendering. Therefore, real time rendering becomes possible even when interactively changing the position of the light source.

Second Embodiment

In the first embodiment, the case where the position of the light source was input was explained, but in the second embodiment, the case where the object is moved is considered. For example, in FIG. 2, the state of the light source 5 arranged at the left when viewed from the object 1 expressing the face of a person is shown, but both when the object 1 expressing the face of a person is fixed in place and the light source 5 is moved to that position and when the light source 5 is fixed in place and the object 1 expressing the face of a person is moved to that position, the positional relationship between the light source 5 and the object 1 expressing the face of a person remains the same. If the positional relationship does not change, the shadow data of the vertexes of the object 1 expressing the face of a person also does not change. Therefore, if the present invention is used, the amount of calculation for the shadow data can be reduced even when the position of the object, not only the position of the light source, changes.

(Pre-processing)

The pre-processing of the second embodiment is exactly the same as that of the first embodiment. The lighting is calculated by fixing the object in place and arranging the light source at different reference positions so as to calculate the shadow data sets corresponding to the reference positions.

(Processing of Second Embodiment)

(1) Overall Flow of Processing

The second embodiment is exactly the same as the first embodiment in the portion shown in FIG. 8. That is, an operational input or an input from a program is received, the position of the light source or other state is changed in accordance with the input, and the processing for generation of the interpolated shadow data set and processing for drawing an object are executed. In the second embodiment, however, the case of movement of the object will be explained by having movement of the object input at step S12 of FIG. 8 and changing the state due to movement of the object at step S14.

(2) Processing for Generating Interpolated Shadow Data Set

In the processing for generation of an interpolated shadow data set in the second embodiment, there is a change in step S23 of FIG. 9. The positional data X and Y of the light source at step S23 of FIG. 9 corresponds to the relative positional data of the light source in the second embodiment. Therefore, it is necessary to find the relative position of the light source from the movement of the object. Simple movement without rotation of the object may be calculated by:

Relative position of light source=current position of light source−position of object (7)

The "current position of the light source" is the absolute position of the fixed light source. Further, even rotation of the object, if simple rotation about a single axis, can be calculated by:

Relative angle of light source=current angle of light source−angle of object (8)

The "current angle of the light source" is the absolute angle of the fixed light source. Further, the following processing becomes necessary if generalizing movement including parallel movement and rotation of an object. First, the position and orientation of the object in the pre-processing are made the reference position and reference orientation of the object, and the transform from that reference position and reference orientation of the object to the current position and orientation of the object is made "T". The reverse transform R of the transform T is found. Further, R transform is applied to the current position and orientation of the light source. The R transformed position and orientation of the light source become the positional data X and Y of the light source at step S23 in FIG. 9. This is because if applying an R transform to the current position and orientation of the object, the object returns to the reference position and reference orientation, so if an R transform is applied to the current position and orientation of the light source, the position and orientation of the light source in the state with the object arranged in the reference position and reference orientation are found. If applying the above processing, the following processing becomes the same as the first embodiment. That is, the weight values of X and Y and the four indexes are calculated and interpolation is performed using the weight values for the shadow data sets corresponding to the four indexes so as to generate the interpolated shadow data set for a predetermined vertex of an object.

(3) Processing for Drawing Object

Figure 12:
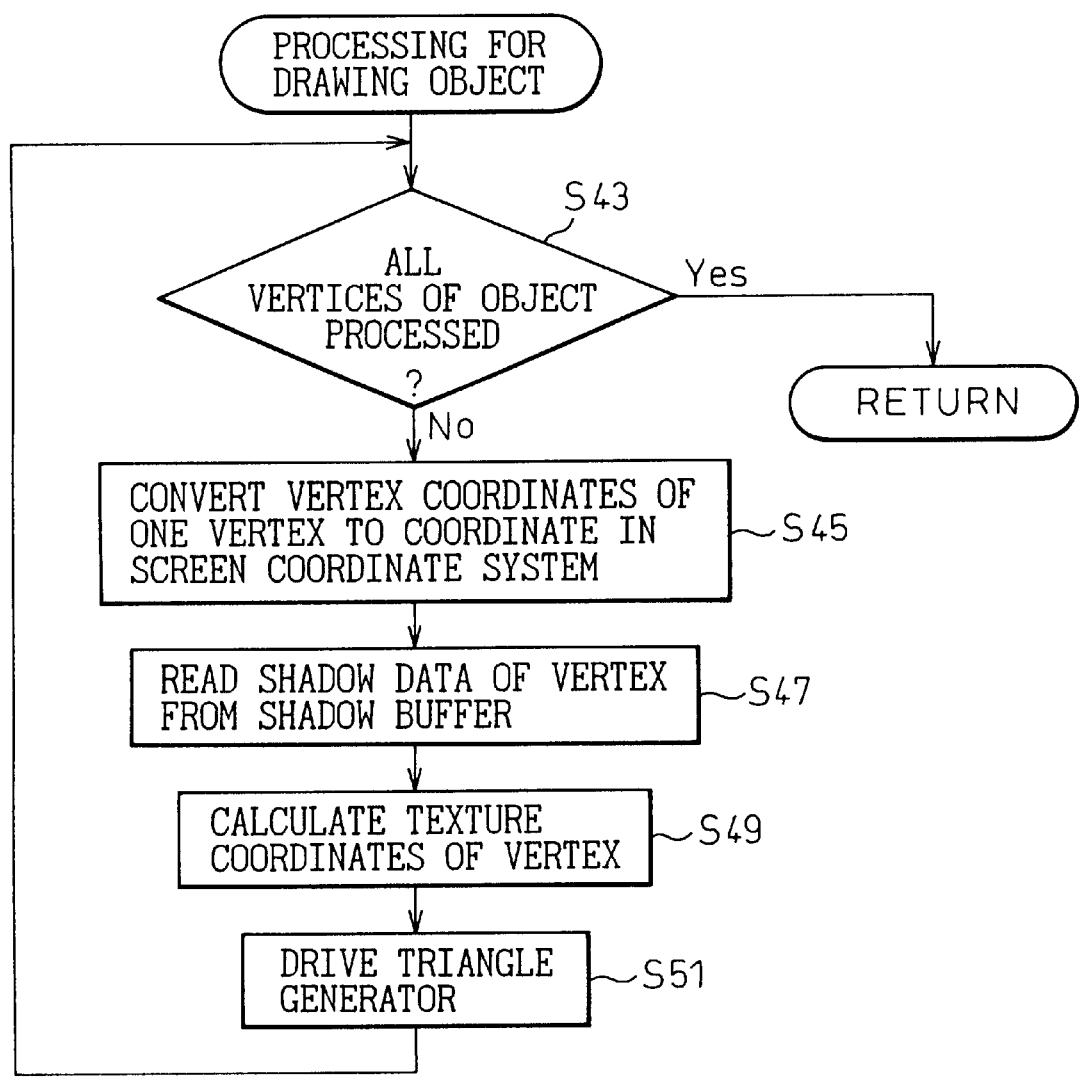
FIG. 12 is a flow chart of the processing for drawing an object in FIG. 8.

The second embodiment is exactly the same as the first embodiment in the processing for drawing an object (FIG. 12). That is, each point of the object is subjected to perspective transformation, the shadow data of each vertex is read, the texture coordinates are calculated, and the triangle generator (for example, the graphic processor 111 of FIG. 1) is driven.

As explained above, even when the object moves rather than the light source, it becomes possible to calculate the shadow data at each vertex of a polygon of an object at a high speed without calculating the lighting at the time of rendering. Note that when the position of the light source is changed in addition to movement of the object, processing becomes possible by adding the movement of the light source to the relative position of the light source explained above.

Third Embodiment

The third embodiment relates to the definition of the lattice as shown in FIG. 4. The explanation of the first embodiment was based on the position of the light source included in the operational input by the operator or input from the program (step S12 of FIG. 8) and the position in the lattice shown in FIG. 4 being in the same space. That is, it is assumed the lattice shown in FIG. 4 is in the virtual space and the light source can be arranged only at points in the lattice. The virtual space and the space laid out by the lattice used in the interpolation (hereinafter referred to as the "shadow data set space") may also be independent. In this case, the position of the light source in the virtual space must be mapped in the shadow data set space.

(Pre-processing)

The pre-processing of the third embodiment is exactly the same as the pre-processing of the first embodiment in the processing for calculating lighting and the content of the shadow data set. That is, the lighting is calculated by fixing the object in place and arranging the light source at different reference positions so as to calculate the shadow data sets corresponding to the reference positions. The meaning of the lattice, however, changes. The lattice point was a reference point of the light source itself, but in the third embodiment, the lattice point of the lattice used in the interpolation corresponds to the reference position of the light source in the shadow data set space.

(Processing of Third Embodiment)

(1) Overall Flow of Processing

The third embodiment is exactly the same as the first embodiment in the portion shown in FIG. 8. That is, an operational input or an input from a program is awaited, the position of the light source or other state is changed in accordance with the input, and the processing for generation of the interpolated shadow data set and processing for drawing an object are executed.

(2) Processing for Generating Interpolated Shadow Data Set

Figure 13A:
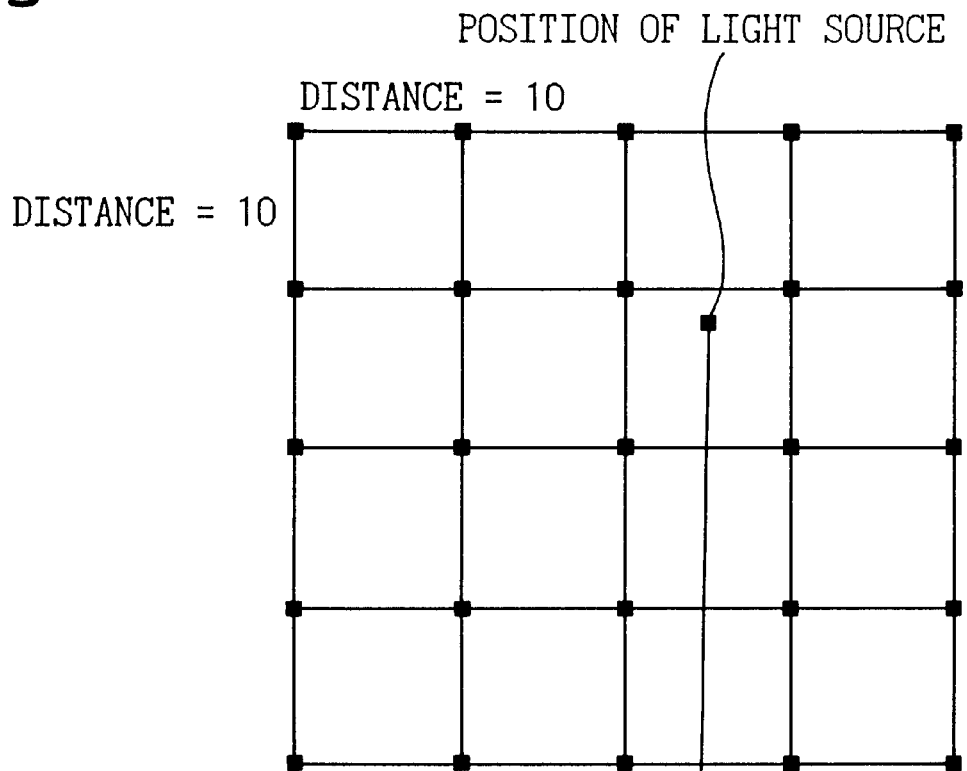
FIG. 13A is a schematic view of a lattice defining a range in which a light source can be arranged in a virtual space.
Figure 13B:
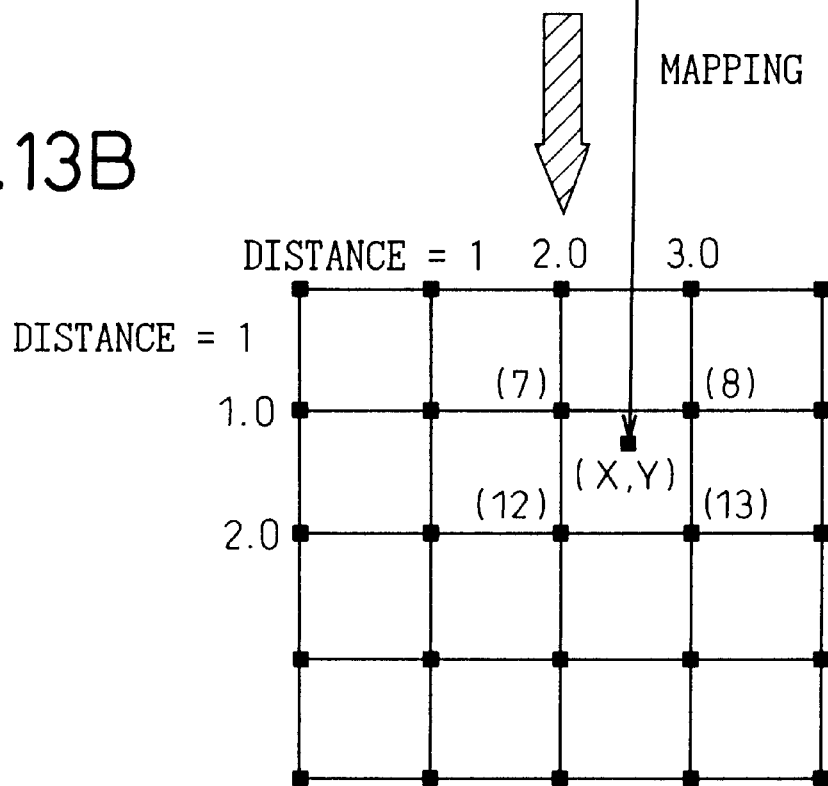
FIG. 13B is a schematic view of a shadow data set space.

The difference from the first embodiment relates to step S23 of FIG. 9. As explained above, in FIG. 9, since the processing is in the shadow data set space, at step S23 of FIG. 9, it is necessary to perform mapping and obtain the positional data X and Y of the light source in the shadow data set space. As shown by FIG. 13A and FIG. 13B, the correspondence between the lattice of virtual space defined as the range in which the light source can be arranged and the shadow data set space is investigated and the position of the light source in the virtual space is converted to the positional data (X,Y) of the light source in the shadow data set space. The rest of the processing of FIG. 9 is the same as in the first embodiment. That is, the weight values of X and Y and the four indexes are calculated and the weight values are used for interpolation on the shadow data sets corresponding to the four indexes to generate an interpolated shadow data set for a predetermined point of the object. Note that when the position of the light source is fixed and the object moves, the relative position of the light source is found, but in this case, the point (X,Y) in the shadow data set space is found from the relative position of the light source.

(3) Processing for Drawing Object

The third embodiment is exactly the same as the first embodiment in the processing for drawing an object (FIG. 12). That is, each point of the object is subjected to perspective transformation, the shadow data of each vertex is read, the texture coordinates are calculated, and the triangle generator (for example, the graphic processor 111 of FIG. 1) is driven.

In the first embodiment, the example of calculation of FIG. 9 was explained. There, the index 0 of the lattice of the FIG. 4 was made the origin and the distance between lattice points in the vertical and horizontal directions was made 10. Here, the same lattice as in the first embodiment is present in the virtual space, the shadow data set space is defined by the lattice and a lattice of a similar shape, the index 0 of the lattice of the similar shape is made the origin, and the distance between lattice points in the vertical and horizontal directions is made 1. In the example of calculation of FIG. 9 explained in the first embodiment, the position (25,12) of the light source was input. If, here too, (25,12) is input, the positional data of the light source in the shadow data set space becomes (2,5,1,2). By defining such a shadow data set space, the processing when finding the indexes of the four nearby lattice points and the processing for calculating the weight values can be simplified. That is, there is no longer a need for processing for normalization by the distance between lattice points.

Fourth Embodiment

The fourth embodiment is a more generalized version of the third embodiment. In particular, the position (X,Y) of the light source in the shadow data set space may be found and used for the processing for generating an interpolated shadow data set even when the position of the light source is designated more abstractly. For example, when North, South, East, and West are defined in the virtual space, "North Northeast" may be input as the position of the light source at step S12 of FIG. 8. In this case, the positional data in the shadow data set space corresponding to "North Northeast" is calculated, the necessary plurality of shadow data sets are read, and interpolation performed. Below, an explanation will be made using the sun as the light source as a readily understandable example.

(Pre-processing)

Here, assume the position from 6 am to 6 pm is drawn. The lighting is calculated by specifically setting the position of the light source (in actuality, the direction of light emitted from the light source) at zero minutes of each hour. 6:00 am is defined as meaning x=0 in the shadow data set space, 7:00 am as x=1, 8:00 am as x=2, and so on to 6:00 pm as x=12. Here, the index=x. The rest is the same as in the first embodiment. That is, the lighting is calculated by fixing the object in place and arranging the light source at each reference position so as to calculate the shadow data set corresponding to each reference point.

(Processing of Fourth Embodiment)

(1) Overall Flow of Processing

In the fourth embodiment, for example, 12:30 pm is input at step S12 of FIG. 8. The rest is the same as in the first embodiment. That is, the position of the light source or other state is changed in accordance with the input and the processing for generating an interpolated shadow data set and the processing for drawing an object are executed.

(2) Processing for Generating Interpolated Shadow Data Set

As already explained, at step S23 of FIG. 9, it is necessary to obtain the positional data X of the light source in the shadow data set space. In the fourth embodiment, the time is input, so it is necessary to map the time in the shadow data set space. FIG. 14A and FIG. 14B show concepts of the mapping. The actually input information is the time. In FIG. 14A, this is shown in parentheses. In the virtual space, however, the positions of the light source (sun) 31, 32, 33, and 34 such as shown in FIG. 14A (in actuality, the directions of light) are envisioned. This time information is mapped in the one-dimensional shadow data set space from x=0 to x=12 (shown in FIG. 14B). For example, 12:30 pm is mapped as X=6.5. If this X=6.5 is obtained, it is learned that the weight value wx=0.5 and the shadow data set required for interpolation is the shadow data set at x=6 and x=7. The shadow data of each vertex can be linearly interpolated using the weight value wx. Therefore, except for the mapping, the processing is substantially the same as the processing shown in FIG. 9. That is, the weight values of the positional data X and Y and the four indexes are calculated and these weight values are used for interpolation on the shadow data sets corresponding to the four indexes so as to generate the interpolated shadow data set for a predetermined vertex of the object.

(3) Processing for Drawing Object

The fourth embodiment is exactly the same as the first embodiment in the processing for drawing an object (FIG. 12). That is, each point of the object is subjected to perspective transformation, the shadow data of each vertex is read, the texture coordinates are calculated, and the triangle generator (for example, the graphic processor 111 of FIG. 1) is driven.

As explained above, in the fourth embodiment, it becomes possible to handle a variety of inputs (step S12 of FIG. 8). Note that in some cases, the positional data of the light source in the shadow data set space (x=6.5 in the above example) may also be input at step S12 of FIG. 8. Further, in the case of the sun, even if the time is input, since it is a source of parallel light, this may be considered the input of the direction of the light emitted from the light source, not the position of the light source. In this case, the fourth embodiment may be interpreted as including mapping the direction of the light for positional data of the light source in the shadow data set space.

Fifth Embodiment

In the fifth embodiment, another method of designation of the light source is considered. In the first to fourth embodiments, the light source was designated by position directly or indirectly. When for example the sun is the light source, however, the position of the light source is considered infinitely far away and the light source is sometimes treated as a source of parallel light. In this case, what may be input is the direction of light emitted from the light source. In the fifth embodiment, the explanation will be given of the processing when the direction of light emitted from the light source is input.

(Pre-processing)

In the first embodiment, the position of the light source was designated and the lighting calculated by the light emitted from that position, but in the fifth embodiment, the lighting is calculated for every direction of light which can be set (reference directions) and the results stored as shadow data sets for those directions. This is the only point of difference in the pre-processing. The case where the direction of light is set in the form of a vector (Vx,Vy,Vz) and the case where it is set in the form of polar coordinates (θx, θy) at least may be considered.

The case of a vector is the same as the case of a three-dimensional position being designated. The case of polar coordinates is the same as designation of a two-dimensional position. Therefore, in the case of a vector, a three-dimensional lattice is provided as a shadow data set space as shown in FIG. 15 and each vector is linked with lattice points. On the other hand, in the case of polar coordinates, the lattice shown in FIG. 4 is provided as a shadow data set space and the polar coordinates linked with lattice points.

(Processing of Fifth Embodiment)

(1) Overall Flow of Processing

The overall flow of processing in the fifth embodiment differs from the first embodiment only in the point of the direct of the light emitted from the light source being input at step S12 of FIG. 8 instead of the position of the light. The position of the light source or other state is changed in accordance with this input and the processing for generating of an interpolated shadow data set and processing for drawing an object executed.

(2) Processing for Generating Interpolated Shadow Data Set

The processing for generating an interpolated shadow data set in the fifth embodiment treats a vector (Vx,Vy,Vz) as the positional data (X,Y,Z) of the light source at step S23 of FIG. 9 in the first embodiment when the direction of light is input by a vector. It treats the polar coordinates (θx,θy) as the positional data (X,Y) of the light source at step S23 of FIG. 9 in the first embodiment when the direction of light is input by polar coordinates. Note that it merely treats the data as positional data at step S23 of FIG. 9. The meaning is directional data. The processing after step S23 is the same as that of the first embodiment. That is, the weight values of the directional data X and Y and the four indexes are calculated and interpolation performed using the weight values on the shadow data set corresponding to the four indexes so as to generate an interpolated shadow data set for a predetermined vertex of an object.

(3) Processing for Drawing Object

The fifth embodiment is exactly the same as the first embodiment in the processing for drawing an object (FIG. 12). That is, each point of the object is subjected to perspective transformation, the shadow data of each vertex is read, the texture coordinates are calculated, and the triangle generator (for example, the graphic processor 111 of FIG. 1) is driven.

As explained above, even if the direction of light is designated, the present invention can be applied without almost any change in the flow of processing from that where the position of the light source is designated.

Sixth Embodiment

In the fifth embodiment, the case was envisioned of the absolute direction of light emitted from the light source being input, but in the same way as the relationship of the first embodiment and the second embodiment, if the object moves, the direction of light also relatively moves. The sixth embodiment treats this as the object having moved.

(Pre-processing)

The sixth embodiment is exactly the same as the fifth embodiment. That is, the object is fixed in place, the lighting is calculated by each reference direction of light emitted from the light source, and the shadow data set is calculated corresponding to each reference direction.

(Processing of Sixth Embodiment)

(1) Overall Flow of Processing

In the fifth embodiment, the absolute direction of light was input at step S12 of FIG. 8. In the sixth embodiment, however, the input is due to movement of the object. The rest is exactly the same as the fifth embodiment. That is, the state is changed in accordance with this input and the processing for generating an interpolated shadow data set and processing for drawing an object are executed.

(2) Processing for Generation of Interpolated Shadow Data Set

The fifth embodiment treats the vector (Vx,Vy,Vz) as the positional data (X,Y,Z) of the light source at step S23 of FIG. 9 or treats the polar coordinates (θx,θy) as the positional data (X,Y) of step S23 of FIG. 9, so in the sixth embodiment, it is sufficient to add processing for calculating the relative position at step S23 of FIG. 9. The same is true as in the processing for generating an interpolated shadow data set of the second embodiment. Simple movement without rotation of the object may be calculated by:

$$\text{Relative direction of light} = \text{current direction of light} - \text{position of object} \quad (9)$$

The "current direction of light" is the absolute direction of the fixed light. Further, even rotation of the object, if simple rotation about a single axis, can be calculated by:

$$\text{Relative angle of light} = \text{current angle of light} - \text{angle of object} \quad (10)$$

The "current angle of light" is the absolute angle of the fixed light.

Further, the following processing becomes necessary if generalizing movement including parallel movement and rotation of an object. First, the position and orientation of the object in the pre-processing are made the reference position and reference orientation of the object, and the transform from that reference position and reference orientation of the object to the current position and orientation of the object is made "T". The reverse transform R of the transform T is found. Further, R transform is applied to the current position and orientation of the light source. The R transformed direction of the light source becomes the directional data X and Y of the light source at step S23 in FIG. 9. The rest of the calculation is the same as in the fifth embodiment. That is, the weight values of the directional data X and Y and the four indexes are calculated and interpolation is performed using the weight values for the shadow data sets corresponding to the four indexes so as to generate the interpolated shadow data set for a predetermined vertex of an object.

(3) Processing for Drawing Object

The sixth embodiment is exactly the same as the first embodiment in the processing for drawing an object (FIG.

12). That is, each point of the object is subjected to perspective transformation, the shadow data of each vertex is read, the texture coordinates are calculated, and the triangle generator (for example, the graphic processor 111 of FIG. 1) is driven.

As explained above, in the sixth embodiment, the present invention can be applied even if the direction of light rather than the position of the light source is designated and the object moves.

Other Embodiments (1) First Modification of FIG. 9

In FIG. 9, four indexes were calculated in the case of a two-dimensional shadow data set space, eight in the case of a three-dimensional space, and two in the case of a one-dimensional space and these shadow data sets interpolated. When the position of the light source input matches with a lattice point of the shadow data set space (reference position or reference direction of light source), it is possible to calculate a plurality of indexes in the same way as when it does not match or possible to output as is the shadow data set at the matching lattice point as is as the interpolated shadow data set. If performing processing in the same way as when not matching with a lattice point, the flow of processing becomes simplified, but if outputting the shadow data set at the matching lattice point as is as the interpolated shadow data set, the amount of calculation can be reduced.

(2) Second Modification of FIG. 9

Four indexes were calculated in the case of a two-dimensional shadow data set space, eight in the case of a three-dimensional space, and two in the case of a one-dimensional space, but other numbers of indexes may also be calculated and interpolation performed considering the corresponding shadow data sets.

(3) Third Modification of FIG. 9

In the first to sixth embodiments, only linear interpolation was explained, but the invention may also be applied to nonlinear interpolation.

(4) Coverage of Calculation of Shadow Data

In the first to sixth embodiments, the shadow data was calculated for each vertex of a polygon of an object, but it is also possible to calculate it for each plane or curved surface making up the object.

(5) Lattice

In the first to fourth embodiments, the reference positions of the light source were arranged in a lattice, but the selection of reference positions is not limited to this.

(6) Content of Shadow Data

In the first to sixth embodiments, the displacement from the reference luminance (brightness) was calculated in advance as shadow data. This displacement from the reference luminance enables a reduction in the amount of data when the light is colorless. When the light is defined in color, however, the shadow data also includes a color component. For example, if the light is a single color of any of RGB, the luminance of only that color is calculated by just further holding the information of the color. If the light is a color of a mixed RGB, the luminance of each color is calculated. This luminance may also be displacement from a reference luminance. Further, it may also be converted to the format of shadow data used in the processing for drawing an object.

(7) Modification of Processing for Drawing Object

FIG. 12 showed an example of texture mapping, but texture mapping does not necessarily have to be performed. For example, it is also possible to define a color for a vertex of a polygon or define a color for a polygon as a whole. For example, when a color is defined for the vertex of a polygon, the shadow data is converted to the value $\beta$ of the range 0.0 to 1.0 and $(R x \beta, G x \beta, B x \beta)$ is calculated by multiplying the color (R,G,B) of the vertex of the polygon with $\beta$. Further, if this $(R x \beta, G x \beta, B x \beta)$ is input to the triangle generator, a color obtained by interpolating the $(R x \beta, G x \beta, B x \beta)$ of each vertex can be given for each pixel.

(8) Modification of Object

In addition to movement of the object, a change in shape of the object may also be considered. For example, when the object I expressing the face of a person of FIG. 2 and FIG. 3 changes to indicate a smile, the positions of the vertexes of the polygons just shift slightly, so it is sufficient to recalculate the interpolated shadow data set. This is because the shadows move together with the movement of the positions of the polygons.

In the case of a large change, all of the shadow data set is recalculated for each predetermined stage of change. That is, the shadow data set may be extended in the direction of the time axis.

(9) Modification of Hardware Used

In the embodiments explained above, the disclosure was made of executing part (processing of triangle generator) of the processing for drawing an object (step S16 of FIG. 8) by the graphic processor 111, but it is also possible to have the entire processing for drawing the object performed by the graphic processor 111 or have it performed by the processor 103.

Further, FIG. 1 was just an example. Various modifications are possible. For example, a game console need not have an HDD 107 and may be supplied with the program and data from just a CD-ROM 131. In this case, instead of the HDD 107, the interface unit 117 may be provided with a read/write interface for a memory card for storing data. Further, whether or not to provide a communications interface 115 is optional. The present invention is not directly related to sound processing, so there is no need to provide the sound processor 109. Further, the CD-ROM 131 is just one example of a storage medium. The storage medium may also be a floppy disk, magneto-optic disk, DVD-ROM, memory cartridge, etc. In this case, the CD-ROM drive 113 must be changed to a drive suited for the medium.

Further, the above explanation was of the case of loading the present invention by a computer program, but it is also possible to load it by a combination of a computer program and an electronic circuit or other special hardware or by just an electronic circuit or other special hardware. At this time, the hardware may also be configured for each function expressed by each step of FIG. 8 or may be configured for each part or combination of the same.

The present invention was explained in detail above based on embodiments, but is not limited to these embodiments and may be suitably modified within the range of its gist. For example, in the above embodiments, the explanation was made of the case of realizing the present invention using an ordinary computer as a platform, but the invention may also be realized using a home game system, arcade machine, or the like as a platform. In some cases, it is also possible to realize it using a portable data terminal, car navigation system, etc. as a platform.

The program or data for realizing the present invention is not limited to ones of a form provided by a CD-ROM or other storage medium able to be loaded into a computer or game console. That is, the program or data for realizing the present invention may also be of a form stored in a memory of other hardware on a network 151 connected through a communications line 141 by the communications interface 115 shown in FIG. 1 and successively downloaded to the memory 105 as needed through the communications line 141.

Example of Display

Figure 16:
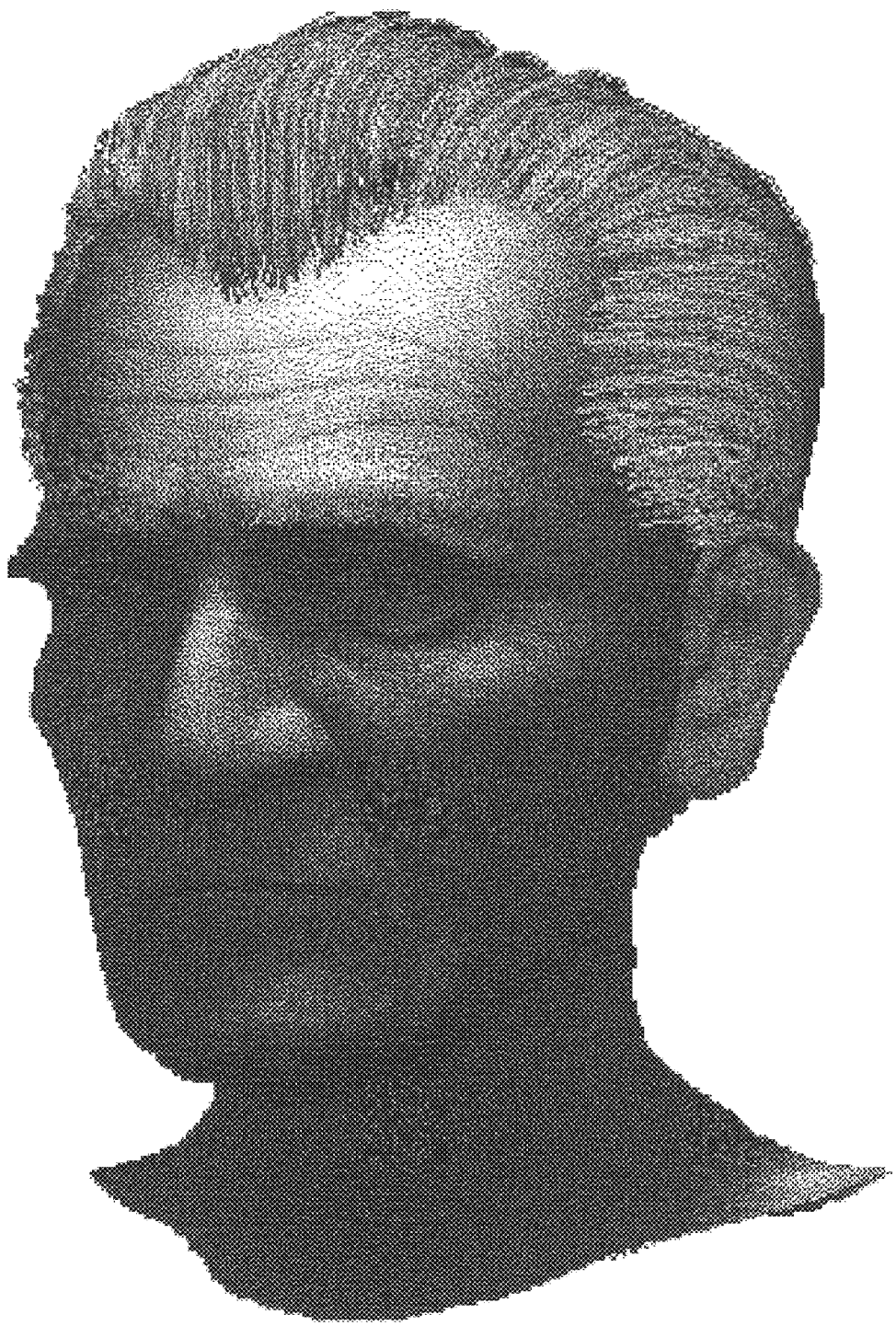
FIG. 16 is an example of the results of rendering when arranging the light source at the lattice point of A in FIG. 8.
Figure 17:
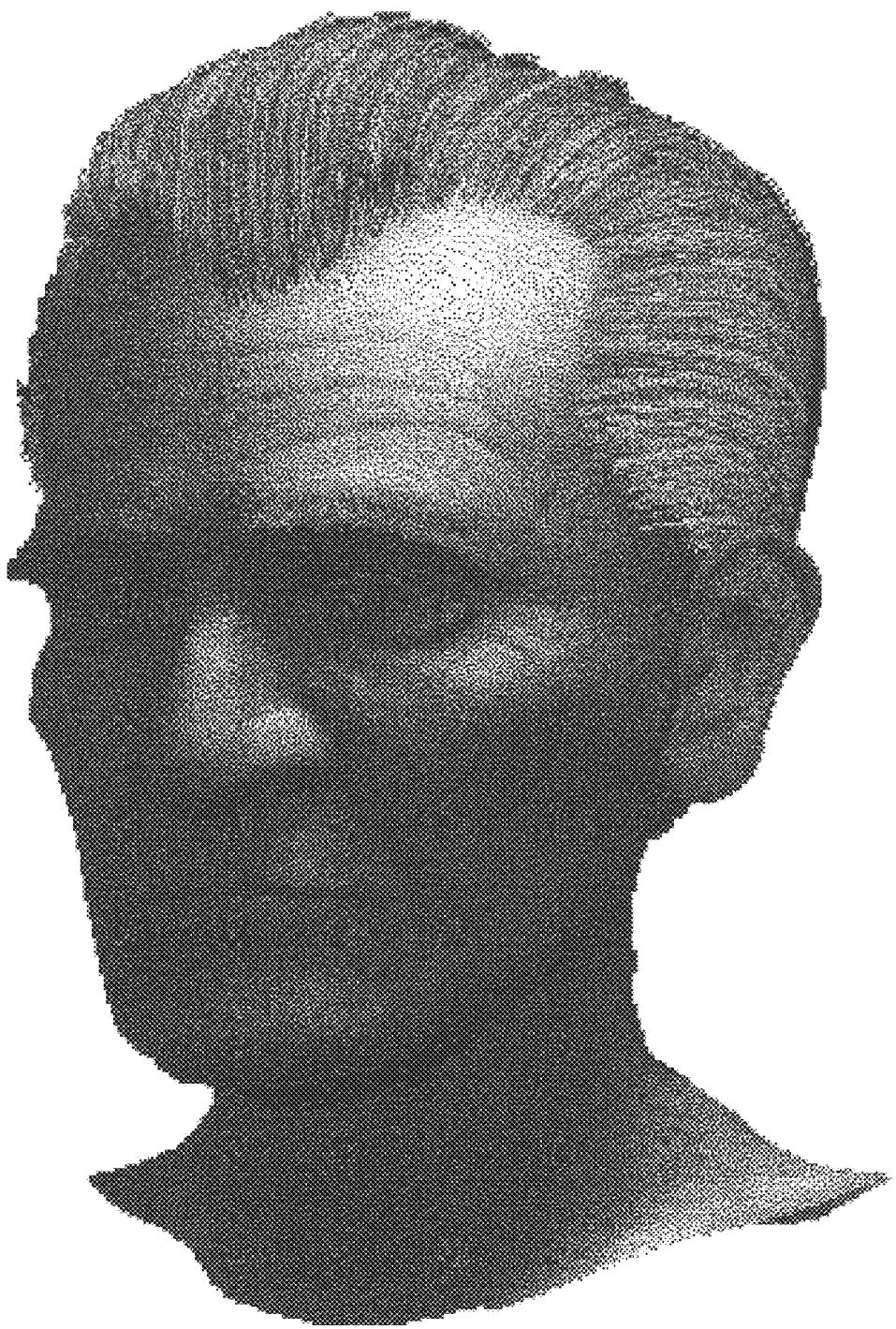
FIG. 17 is an example of the results of rendering when arranging the light source at the lattice point of B in FIG. 8.
Figure 18:
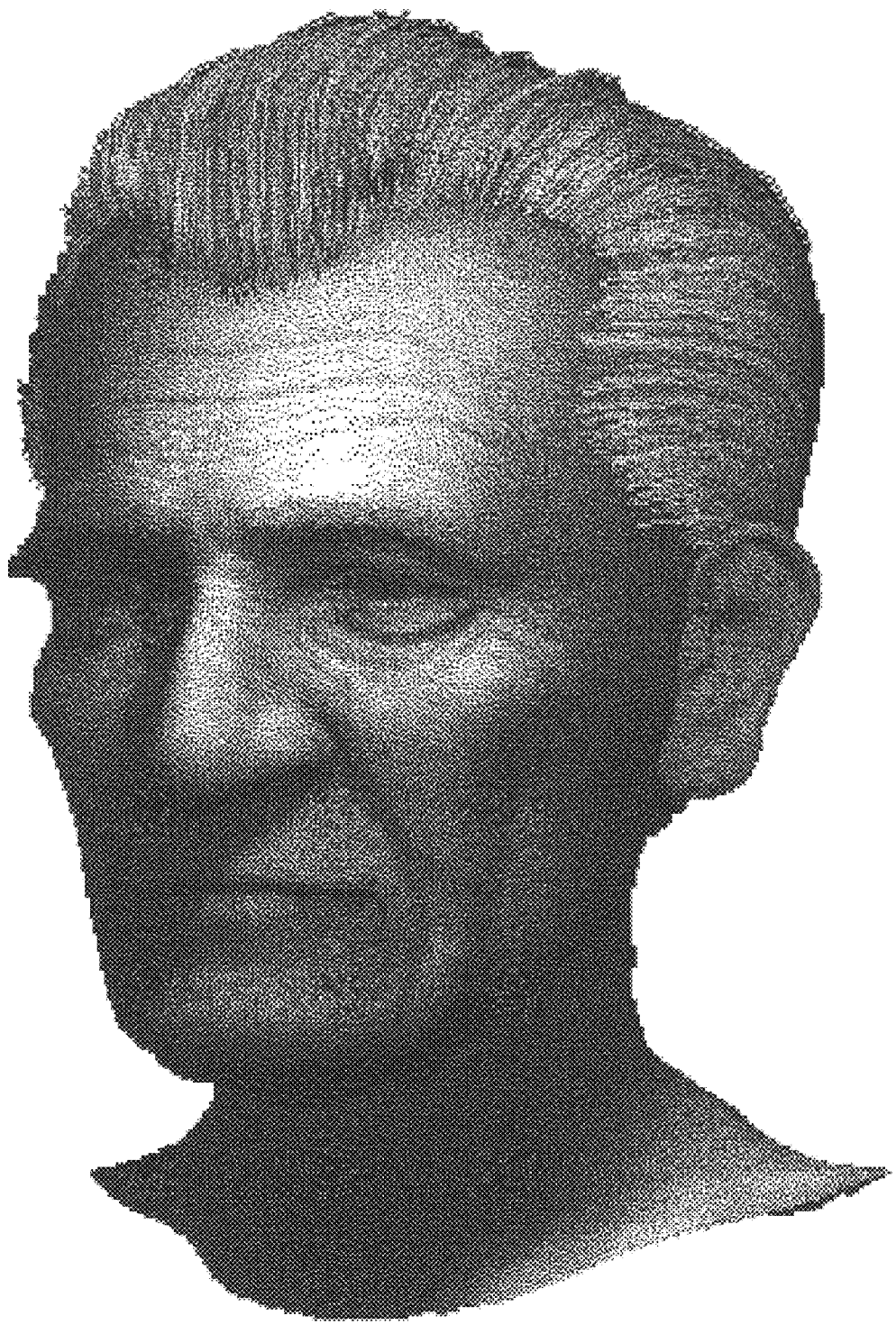
FIG. 18 is an example of the results of rendering when arranging the light source at the lattice point of C in FIG. 8.
Figure 19:
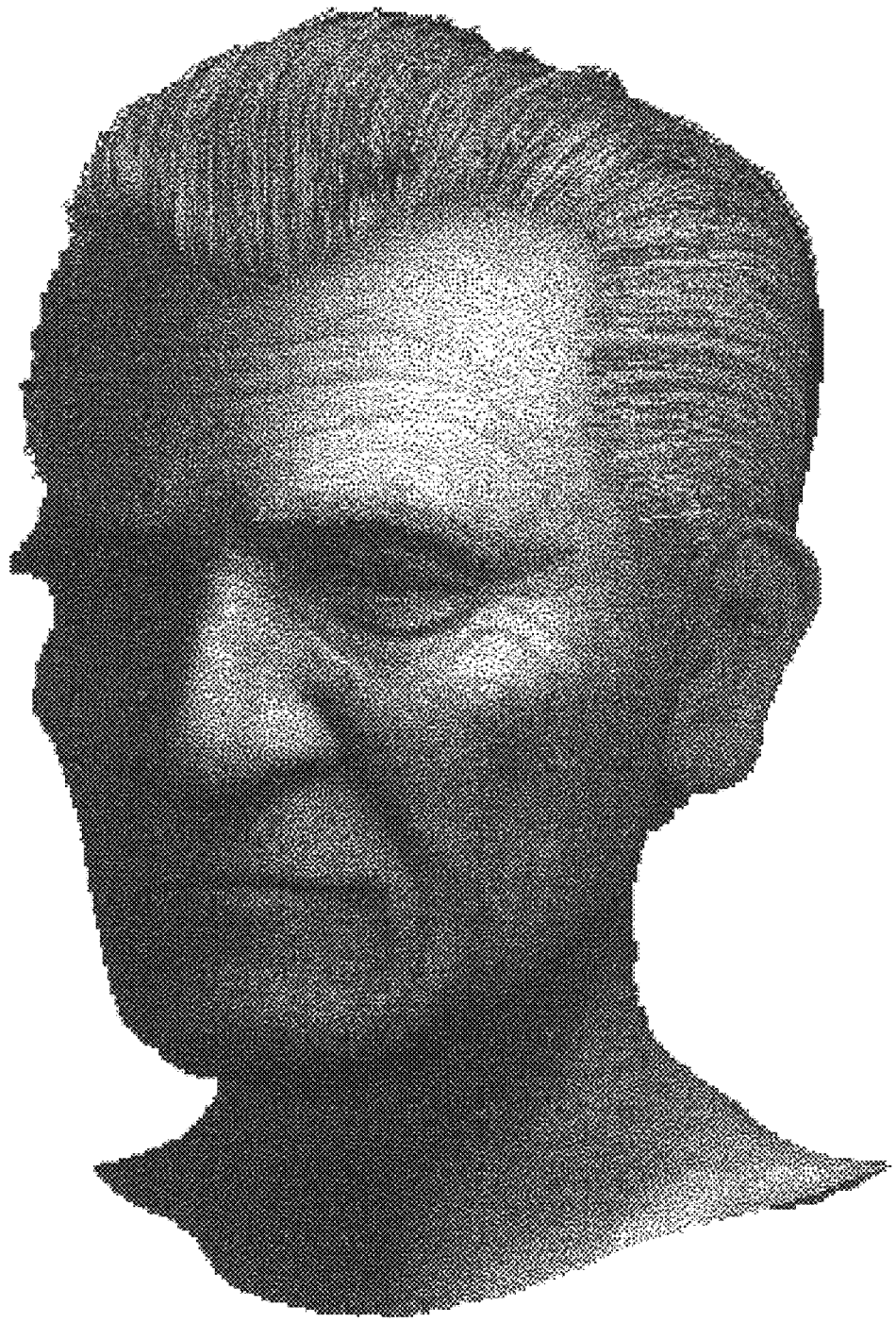
FIG. 19 is an example of the results of rendering when arranging the light source at the lattice point of D in FIG. 8.
Figure 20:
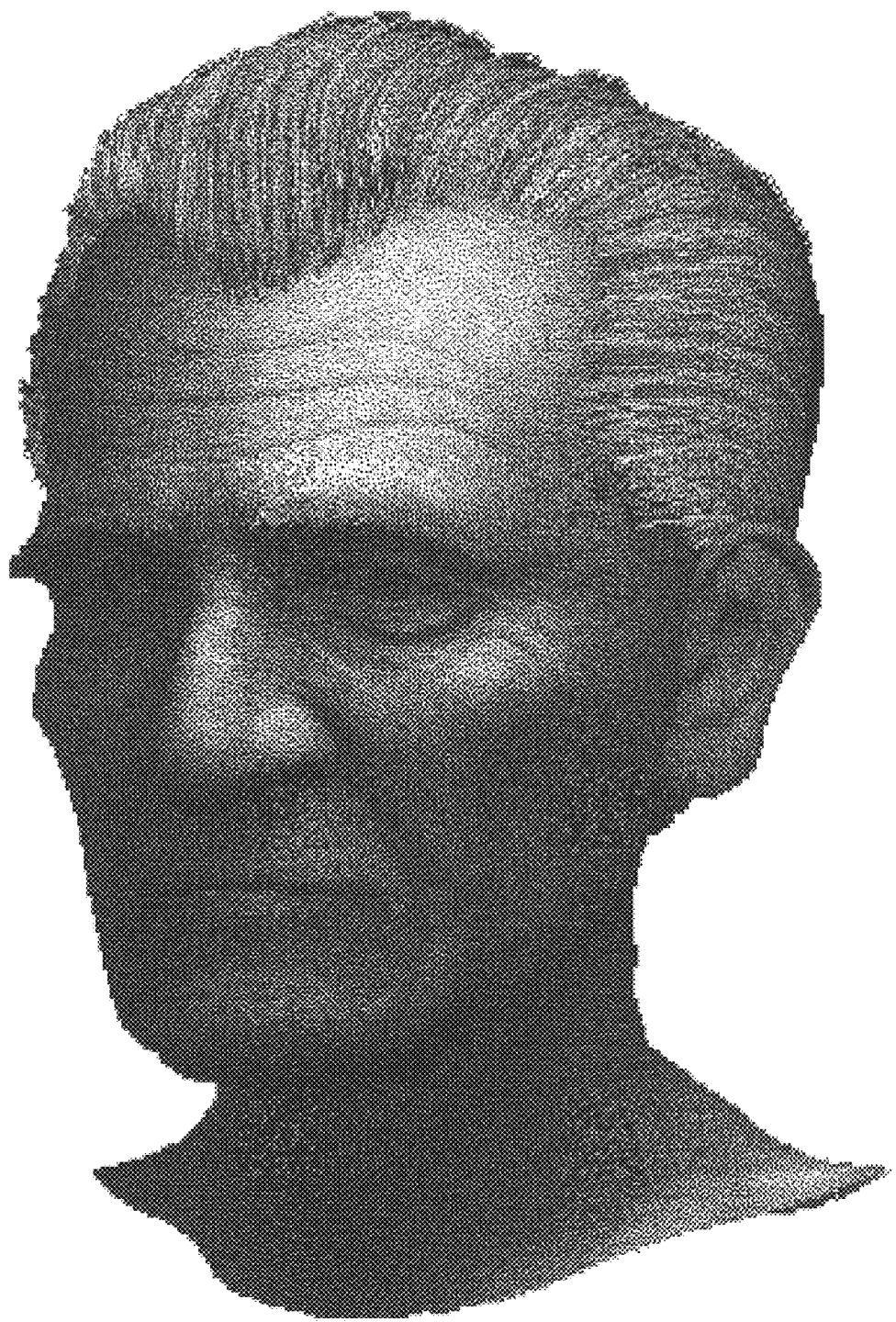
FIG. 20 is an example of the results of use of the present invention for rendering when arranging the light source at the point of ABCD in FIG. 8.

In the above, examples of application of the present invention to rendering an object expressing the face of a person were shown. For example, the result of rendering in the case of arranging the light source at a lattice point of A in FIG. 10 is shown in FIG. 16. The result of rendering in the case of arranging the light source at a lattice point of B in FIG. 10 is shown in FIG. 17. The result of rendering in the case of arranging the light source at a lattice point of C in FIG. 10 is shown in FIG. 18. The result of rendering in the case of arranging the light source at a lattice point of D in FIG. 10 is shown in FIG. 19. When arranging the light source at the point of ABCD of FIG. 10, the result of application of the present invention for rendering becomes as shown in FIG. 20. Looking at FIG. 16, the top center portion of the face (portion close to hair) becomes brighter. Looking at FIG. 17, the top right portion of the forehead becomes brighter. On the other hand, looking at FIG. 18, the portion above the eyebrow becomes brighter. Further, comparing FIG. 16 and FIG. 17, the portion of the forehead below the eyebrow also becomes slightly bright. Looking at FIG. 19, the portion of the forehead slightly to the right above the eyebrow and the corner of the right eye become brighter. In FIG. 18 and FIG. 19, the heights of the bright portions are about the same, but in FIG. 19, the portion to the left of the face becomes darker than FIG. 18. In FIG. 20 to which the present invention was applied, a characteristic intermediate to those of FIG. 16 to FIG. 19 appears. That is, the right side of the face as a whole and the corner of the right eye become slightly brighter and the portion below the eyebrow also has a certain brightness.

The present invention may be summarized as follows:

The method of rendering an object in a virtual space comprises obtaining positional data of a light source arranged in a virtual space (for example, a three-dimensional space), selecting from a plurality of data sets relating to shadow (for example, a shadow data set in the embodiments) corresponding to preset light source positions and calculated and stored in advance for a specific element of the object a data set relating to shadow relating to the obtained positional data of the light source; interpolating from a plurality of data sets relating to shadow based on the obtained positional data of the light source to generate an interpolated shadow data set when there are a plurality of data sets relating to shadow selected; and using the interpolated shadow data set to draw the object in the virtual space. Due to this, it is possible to realize a similar image as when calculating lighting even when changing the position of the light source interactively. In addition, the amount of calculation required when changing the position of the light source can be reduced. Note that the specific element of the object referred to above is selected without regard as to the position of the perspective in the present invention.

It is also possible to obtain the absolute position of the light source in the virtual space or the relative position of the object and light source as the positional data. Further, it is possible to convert the absolute position of the light source in the virtual space or the relative position of the object and light source to the position of a point in a shadow data set space comprised of points corresponding to preset light source positions and obtain the position of that point in the shadow data set space as the positional data. For example, when the position (150) of the light source is designated in the range of 100 to 200 in the virtual space and the shadow data set space for interpolation of the data set relating to shadow is defined by a range from 0 to 10, this indicates to performing mapping from the position (150) in the virtual space to the position (5) in the shadow data set space.

In the present invention, the method further includes designation of the position of the light source in the virtual space. The designation may be converted to the position of a point in the shadow data set space comprised of points corresponding to preset light source positions and the position of the point in the shadow data set space obtained as the positional data. The "designation of the position of the light source", as explained in the embodiments, is for example information such as "North Northeast" indicating the position of the light source indirectly.

It is also possible to select from a plurality of data sets relating to shadow corresponding to preset light source positions and calculated and stored in advance for a vertex of a polygon of an object or a surface of an object a data set relating to shadow relating to the obtained positional data of the light source. Further, it is also possible to select from a plurality of data sets relating to shadow corresponding to preset light source positions, calculated and stored in advance for a specific element of the object, and expressed by displacement from a reference luminance a data set relating to shadow relating to the obtained positional data of the light source. Still further, it is also possible to select from a plurality of data sets relating to shadow corresponding to preset light source positions, calculated and stored in advance for a specific element of the object, and expressed by luminance of at last one of the three primary colors a data set relating to shadow relating to the obtained positional data of the light source.

The method of rendering of the present invention comprises obtaining directional data of a light source arranged in a virtual space, selecting from a plurality of data sets relating to shadow corresponding to preset directions of light and calculated and stored in advance for a specific element of the object a data set relating to shadow relating to the obtained directional data of light, interpolating from a plurality of data sets relating to shadow based on the obtained directional data of the light to generate an interpolated shadow data set when there are a plurality of data sets relating to shadow selected, and using the interpolated shadow data set to draw the object in the virtual space. Due to this, it is possible to realize a similar image as when calculating lighting even when changing the position of the light source interactively. In addition, the amount of calculation required when changing the direction of the light from the light source can be reduced.

It is also possible to obtain the absolute direction of light from the light source in the virtual space or the relative direction of the light in the relationship between the object. Further, it is possible to obtain the light vector as the directional data when the light vector of a light source in a virtual space is designated.

It is also possible to select from a plurality of data sets relating to shadow corresponding to preset directions of light and calculated and stored in advance for a vertex of a polygon of an object or a surface of an object a data set relating to shadow relating to the obtained directional data of the light. Further, it is also possible to select from a plurality of data sets relating to shadow corresponding to preset directions of lights, calculated and stored in advance for a specific element of the object, and expressed by displacement from a reference luminance a data set relating to shadow relating to the obtained directional data of the light. Still further, it is also possible to select from a plurality of data sets relating to shadow corresponding to preset directions of light, calculated and stored in advance for a specific element of the object, and expressed by luminance of at last one of the three primary colors a data set relating to shadow relating to the obtained directional data of the light.

In the present invention, when one data set relating to shadow is selected, that data set relating to shadow may be output as the interpolated shadow data set.

The program for calculating data relating to a shadow of an object in a virtual space comprises obtaining positional data of a light source arranged in a virtual space, selecting from a plurality of data sets relating to shadow corresponding to preset light source positions and calculated and stored in advance for a specific element of the object a data set relating to shadow relating to the obtained positional data of the light source; interpolating from a plurality of data sets relating to shadow based on the obtained positional data of the light source to generate an interpolated shadow data set when there are a plurality of data sets relating to shadow selected; and instructing use of the interpolated shadow data set to draw the object in the virtual space. Further, the program for calculating data relating to shadow of an object in a virtual space comprises obtaining directional data of a light source arranged in a virtual space, selecting from a plurality of data sets relating to shadow corresponding to preset directions of light and calculated and stored in advance for a specific element of the object a data set relating to shadow relating to the obtained directional data of light, interpolating from a plurality of data sets relating to shadow based on the obtained directional data of the light to generate an interpolated shadow data set when there are a plurality of data sets relating to shadow selected, and instructing use of the interpolated shadow data set to draw the object in the virtual space. The program according to the present invention is stored in for example a CD-ROM, floppy disk, memory cartridge, memory, hard disk, or other storage medium or storage device. The program stored in the storage medium or storage device enables realization of the following rendering machine and game system by being read into a computer. Further, depending on the storage medium, it may be easily distributed and sold independently from the hardware as a software product. Further, by executing the program using a computer or other hardware, it becomes possible to easily realize the graphic technology of the present invention by this hardware.

The rendering apparatus using the present invention comprises a means for obtaining positional data of a light source arranged in a virtual space, a selector for selecting from a plurality of data sets relating to shadow corresponding to preset light source positions and calculated and stored in advance for a specific element of the object a data set relating to shadow relating to the obtained positional data of the light source; a generator for interpolating from a plurality of data sets relating to shadow based on the obtained positional data of the light source to generate an interpolated shadow data set when there are a plurality of data sets relating to shadow selected; and a means for using the interpolated shadow data set to draw the object in the virtual space. Alternatively, the rendering apparatus using the present invention comprises a means for obtaining directional data of a light source arranged in a virtual space, a selector for selecting from a plurality of data sets relating to shadow corresponding to preset directions of light and calculated and stored in advance for a specific element of the object a data set relating to shadow relating to the obtained directional data of light, a generator for interpolating from a plurality of data sets relating to shadow based on the obtained directional data of the light to generate an interpolated shadow data set when there are a plurality of data sets relating to shadow selected, and a means for using the interpolated shadow data set to draw the object in the virtual space.

The present invention may also be worked as a game system for rendering an object in a virtual space. This game system comprises a computer and a computer readable program product storing a program for making the computer execute processing for obtaining positional data of a light source arranged in a virtual space, processing for selecting from a plurality of data sets relating to shadow corresponding to preset light source positions and calculated and stored in advance for a specific element of the object a data set relating to shadow relating to the obtained positional data of the light source, processing for interpolating from a plurality of data sets relating to shadow based on the obtained positional data of the light source to generate an interpolated shadow data set when there are a plurality of data sets relating to shadow selected, and processing for instructing use of the interpolated shadow data set to draw the object in the virtual space. Alternatively, the game system of the present invention comprises a computer and a computer readable program product storing a program making a computer execute processing for obtaining directional data of a light source arranged in a virtual space, processing for selecting from a plurality of data sets relating to shadow corresponding to preset directions of light and calculated and stored in advance for a specific element of the object a data set relating to shadow relating to the obtained directional data of light, processing for interpolating from a plurality of data sets relating to shadow based on the obtained directional data of the light to generate an interpolated shadow data set when there are a plurality of data sets relating to shadow selected, and processing for instructing use of the interpolated shadow data set to draw the object in the virtual space.

Summarizing the effect of the invention, it is possible to provide a rendering method and apparatus, game system, and computer readable program product storing a program able to generate a similar image as with normal lighting calculation when changing the position of a light source in a virtual space.

What is claimed is:

1. A method of rendering an object in a virtual space, comprising:

converting one of an absolute position of a light source in the virtual space and a relative position between the object and the light source to a position of a point in a shadow data set space comprised of points corresponding to preset light source positions and obtaining the position of the point in the shadow data set space as positional data of the light source;

selecting from a plurality of data sets relating to a shadow corresponding to preset light source positions and calculated for all vertexes of said object and stored in advance for a specific element of said object a data set relating to shadow relating to the obtained positional data of the light source;

interpolating from a plurality of data sets relating to the shadow based on the obtained positional data of the light source to generate an interpolated shadow data set when there are a plurality of data sets relating to the selected shadow; and using the interpolated shadow data set to draw the object in the virtual space.

2. A method of rendering as set forth in claim 1, further comprising, when obtaining the positional data of the light source, selecting from a plurality of data sets relating to the shadow corresponding to preset light source positions and calculated and stored in advance for one of a vertex of a polygon of the object and a surface of the object a data set relating to the shadow relating to the obtained positional data of the light source.

3. A method of rendering as set forth in claim 1, further comprising, when obtaining the positional data of the light source, selecting from a plurality of data sets relating to the shadow corresponding to preset light source positions, calculated and stored in advance for a specific element of the object, and expressed by displacement from a reference luminance a data set relating to the shadow relating to the obtained positional data of the light source.

4. A method of rendering as set forth in claim 1, further comprising, when obtaining the positional data of the light source, selecting from a plurality of data sets relating to the shadow corresponding to preset light source positions, calculated and stored in advance for a specific element of said object, and expressed by the luminance of at least one of the three primary colors a data set relating to the shadow relating to the obtained positional data of the light source.

5. The method of claim 1, wherein, the light source position and viewpoint position may be different.

6. A method of rendering an object in a virtual space, comprising:
   designating a position of a light source in the virtual space;
   converting the designation to a position of a point in a shadow data set space comprised of points corresponding to preset light source positions and obtaining the position of the point in the shadow data set space as positional data of the light source;
   selecting from a plurality of data sets relating to shadow corresponding to preset light source positions and calculated for all vertexes of said object and stored in advance for a specific element of said object a data set relating to shadow relating to the obtained positional data of the light source;
   interpolating from a plurality of data sets relating to the shadow based on the obtained positional data of the light source to generate an interpolated shadow data set when there are a plurality of data sets relating to shadow selected; and
   using the interpolated shadow data set to draw the object in the virtual space.

7. The method of claim 6, wherein, the light source position and viewpoint position may be different.

8. A method of rendering an object in a virtual space, comprising:
   converting an absolute direction of light from a light source in the virtual space or a relative direction between the object and the light to a position of a point in a shadow data set space comprised of points corresponding to preset directions of light and obtaining the position of the point in the shadow data set space as directional data of the light;
   selecting from a plurality of data sets relating to a shadow corresponding to preset directions of light and calculated for all vertexes of said object and stored in advance for a specific element of said object a data set relating to the shadow relating to the obtained directional data of the light;
   interpolating from a plurality of data sets relating to shadow based on the obtained directional data of the light to generate an interpolated shadow data set when there are a plurality of data sets relating to the selected shadow; and
   using the interpolated shadow data set to draw the object in the virtual space.

9. A method of rendering as set forth in claim 8, further comprising, when obtaining the directional data of the light, selecting from a plurality of data sets relating to shadow corresponding to preset directions of light and calculated and stored in advance for one of a vertex of a polygon of the object and a surface of the object a data set relating to shadow relating to the obtained directional data of the light.

10. A method of rendering as set forth in claim 8, further comprising, when obtaining the directional data of the light, selecting from a plurality of data sets relating to the shadow corresponding to preset directions of light, calculated and stored in advance for a specific element of the object, and expressed by displacement from a reference luminance a data set relating to shadow relating to the obtained directional data of the light.

11. A method of rendering as set forth in claim 8, further comprising, when obtaining the directional data of the light, selecting from a plurality of data sets relating to the shadow corresponding to preset directions of light, calculated and stored in advance for a specific element of said object, and expressed by the luminance of at least one of the three primary colors a data set relating to the shadow relating to the obtained directional data of the light.

12. The method of claim 8, wherein, the light source position and viewpoint position may be different.

13. A method of rendering an object in a virtual space, comprising:
   designating a position of light from a light source in the virtual space;
   converting the designation to a position of a point in a shadow data set space comprised of points corresponding to preset light source directions and obtaining the position of the point in the shadow data set space as directional data of the light from the light source;
   selecting from a plurality of data sets relating to a shadow corresponding to preset directions of light and calculated for all vertexes of said object and stored in advance for a specific element of the object a data set relating to the shadow relating to the obtained directional data of the light;
   interpolating from a plurality of data sets relating to the shadow based on the obtained directional data of the light to generate an interpolated shadow data set when there are a plurality of data sets relating to the selected shadow; and
   using the interpolated shadow data set to draw the object in the virtual space.

14. The method of claim 13, wherein, the light source position and viewpoint position may be different.

15. A computer readable program product storing a program for calculating data relating to a shadow of an object in a virtual space,
   said program instructing the computer to:
      convert one of an absolute position of a light source in said virtual space and a relative position between said object and said light source to a position of a point in a shadow data set space comprised of points corresponding to preset light source positions and obtain the position of the point in the shadow data set space as positional data of the light source;
      select from a plurality of data sets relating to the shadow corresponding to preset light source positions and calculated for all vertexes of said object and stored in advance for a specific element of said object a data set relating to the shadow relating to the obtained positional data of the light source;

interpolate from a plurality of data sets relating to the shadow based on the obtained positional data of the light source to generate an interpolated shadow data set when there are a plurality of data sets relating to a selected shadow; and instruct use of the interpolated shadow data set to draw the object in the virtual space.

16. The program of claim 15, wherein, the light source position and viewpoint position may be different.

17. A computer readable program product storing a program for calculating data relating to a shadow of an object in a virtual space, said program instructing the computer to:
designate a position of a light source in the virtual space;

convert the designation to a position of a point in a shadow data set space comprised of points corresponding to preset light source positions and obtain the position of the point in the shadow data set space as positional data of the light source;

select from a plurality of data sets relating to the shadow corresponding to preset light source positions and calculated for all vertexes of said object and stored in advance for a specific element of said object a data set relating to shadow relating to the obtained positional data of the light source;

interpolate from a plurality of data sets relating to the shadow based on the obtained positional data of the light source to generate an interpolated shadow data set when there are a plurality of data sets relating to the selected shadow; and instruct use of the interpolated shadow data set to draw the object in the virtual space.

18. The program of claim 17, wherein, the light source position and viewpoint position may be different.

19. A computer readable program product storing a program for calculating data relating to a shadow of an object in a virtual space, said program instructing the computer to:
convert one of an absolute direction of light from a light source in the virtual space and a relative direction between said object and said light to a position of a point in a shadow data set space comprised of points corresponding to preset directions of light and obtain the position of the point in the shadow data set space as directional data of the light;

select from a plurality of data sets relating to the shadow corresponding to preset directions of light and calculated for all vertexes of said object and stored in advance for a specific element of said object a data set relating to the shadow relating to the obtained directional data of the light;

interpolate from a plurality of data sets relating to the shadow based on the obtained directional data of the light to generate an interpolated shadow data set when there are a plurality of data sets relating to the selected shadow; and instruct use of the interpolated shadow data set to draw the object in the virtual space.

20. The program of claim 19, wherein, the light source position and viewpoint position may be different.

21. A computer readable program product storing a program for calculating data relating to a shadow of an object in a virtual space, said program instructing the computer to:
designate a position of light from a light source in the virtual space;

convert the designation to a position of a point in a shadow data set space comprised of points corresponding to preset light source directions and obtain the position of the point in the shadow data set space as directional data of the light from the light source;

select from a plurality of data sets relating to the shadow corresponding to preset directions of light and calculated for all vertexes of said object and stored in advance for a specific element of said object a data set relating to the shadow relating to the obtained directional data of the light;

interpolate from a plurality of data sets relating to the shadow based on the obtained directional data of the light to generate an interpolated shadow data set when there are a plurality of data sets relating to the selected shadow; and instruct use of the interpolated shadow data set to draw the object in the virtual space.

22. The program of claim 21, wherein, the light source position and viewpoint position may be different.

23. An apparatus for rendering an object in a virtual space, comprising:

a system that converts an absolute position of a light source in one of said virtual space and a relative position between said object and said light source to a position of a point in a shadow data set space comprised of points corresponding to preset light source positions and obtaining the position of the point in the shadow data set space as positional data of the light source;

a selector that selects from a plurality of data sets relating to a shadow corresponding to preset light source positions and calculated for all vertexes of said object and stored in advance for a specific element of said object a data set relating to said shadow relating to the obtained positional data of the light source;

a generator that interpolates from a plurality of data sets relating to said shadow based on said obtained positional data of said light source to generate an interpolated shadow data set when there are a plurality of data sets relating to said selected shadow; and a system that uses said interpolated shadow data set to draw the object in said virtual space.

24. The apparatus of claim 23, wherein, the light source position and viewpoint position may be different.

25. An apparatus for rendering an object in a virtual space, comprising:

a system that designates a position of a light source in the virtual space;

a system that converts the designation to a position of a point in a shadow data set space comprised of points corresponding to preset light source positions and obtaining the position of the point in the shadow data set space as positional data of the light source;

a selector that selects from a plurality of data sets relating to a shadow corresponding to preset light source positions and calculated for all vertexes of said object and stored in advance for a specific element of said object a data set relating to shadow relating to the obtained positional data of the light source;

a generator that interpolates from a plurality of data sets relating to shadow based on the obtained positional data of the light source to generate an interpolated shadow data set when there are a plurality of data sets relating to shadow selected; and a system that uses the interpolated shadow data set to draw the object in the virtual space.

26. The apparatus of claim 25, wherein, the light source position and viewpoint position may be different.

27. An apparatus for rendering an object in a virtual space, comprising:
   a system that converts an absolute direction of light from a light source in one of the virtual space and a relative direction between said object and said light to a position of a point in a shadow data set space comprised of points corresponding to preset directions of light and obtaining the position of the point in the shadow data set space as directional data of the light;
   a selector that selects from a plurality of data sets relating to a shadow corresponding to preset directions of light and calculated for all vertexes of said object and stored in advance for a specific element of said object a data set relating to shadow relating to the obtained directional data of the light;
   a generator that interpolates from a plurality of data sets relating to the shadow based on the obtained directional data of the light to generate an interpolated shadow data set when there are a plurality of data sets relating to the selected shadow; and
   a system that uses the interpolated shadow data set to draw the object in the virtual space.

28. The apparatus of claim 27, wherein, the light source position and viewpoint position may be different.

29. An apparatus for rendering an object in a virtual space, comprising:
   a system that designates a position of light from a light source in the virtual space;
   a system that converts the designation to a position of a point in a shadow data set space comprised of points corresponding to preset light source directions and obtaining the position of the point in the shadow data set space as directional data of the light from the light source;
   a selector that selects from a plurality of data sets relating to a shadow corresponding to preset directions of light and calculated for all vertexes of said object and stored in advance for a specific element of said object a data set relating to said shadow relating to the obtained directional data of the light;
   a generator that interpolates from a plurality of data sets relating to shadow based on the obtained directional data of the light to generate an interpolated shadow data set when there are a plurality of data sets relating to said selected shadow; and
   a system that uses the interpolated shadow data set to draw the object in the virtual space.

30. The apparatus of claim 29, wherein, the light source position and viewpoint position may be different.

31. A game system for rendering an object in a virtual space, comprising:
   a computer and
   a computer readable program product that stores a program for making a computer execute processing for converting an absolute position of a light source in one of said virtual space and a relative position between said object and said light source to a position of a point in a shadow data set space comprised of points corresponding to preset light source positions and obtaining the position of the point in the shadow data set space as positional data of the light source, processing for selecting from a plurality of data sets relating to a shadow corresponding to preset light source positions and calculated for all vertexes of said object and stored in advance for a specific element of said object a data set relating to said shadow relating to the obtained positional data of the light source, processing for interpolating from a plurality of data sets relating to said shadow based on the obtained positional data of the light source to generate an interpolated shadow data set when there are a plurality of data sets relating to said selected shadow, and processing for instructing use of the interpolated shadow data set to draw the object in the virtual space.

32. The game system of claim 31, wherein, the light source position and viewpoint position may be different.

33. A game system for rendering an object in a virtual space, comprising:
   a computer and
   a computer readable program product storing a program for making the computer execute processing for designating a position of a light source in the virtual space, processing for converting the designation to a position of a point in a shadow data set space comprised of points corresponding to preset light source positions and obtaining the position of the point in the shadow data set space as positional data of the light source, processing for selecting from a plurality of data sets relating to a shadow corresponding to preset light source positions and calculated for all vertexes of said object and stored in advance for a specific element of said object a data set relating to the shadow relating to the obtained positional data of the light source, processing for interpolating from a plurality of data sets relating to the shadow based on the obtained positional data of the light source to generate an interpolated shadow data set when there are a plurality of data sets relating to the selected shadow, and processing for instructing use of the interpolated shadow data set to draw the object in the virtual space.

34. The game system of claim 33, wherein, the light source position and viewpoint position may be different.

35. A game system for rendering an object in a virtual space, comprising:
   a computer and
   a computer readable program product storing a program for making the computer execute processing for converting an absolute direction of light from a light source in the virtual space or a relative direction between said object and said light to a position of a point in a shadow data set space comprised of points corresponding to preset directions of light and obtaining the position of the point in the shadow data set space as directional data of the light, processing for selecting from a plurality of data sets relating to a shadow corresponding to preset directions of light and calculated for all vertexes of said object and stored in advance for a specific element of said object a data set relating to the shadow relating to the obtained directional data of the light, processing for interpolating from a plurality of data sets relating to the shadow based on the obtained directional data of the light to generate an interpolated shadow data set when there are a plurality of data sets relating to the selected shadow, and processing for instructing use of the interpolated shadow data set to draw the object in the virtual space.

36. The game system of claim 35, wherein, the light source position and viewpoint position may be different.

37. A game system for rendering an object in a virtual space, comprising:
   a computer and
   a computer readable program product storing a program for making the computer execute processing for designating a position of light from a light source in the virtual space, processing for converting the designation to a position of a point in a shadow data set space comprised of points corresponding to preset light source directions and obtaining the position of the point in the shadow data set space as directional data of the light from the light source, processing for selecting from a plurality of data sets relating to a shadow corresponding to preset directions of light and calculated for all vertexes of said object and stored in advance for a specific element of said object a data set relating to the shadow relating to the obtained directional data of the light, processing for interpolating from a plurality of data sets relating to the shadow based on the obtained directional data of the light to generate an interpolated shadow data set when there are a plurality of data sets relating to the selected shadow, and processing for instructing use of the interpolated shadow data set to draw the object in the virtual space.

38. The game system of claim 37, wherein, the light source position and viewpoint position may be different.

39. A method of rendering an object in a virtual space, comprising:
   receiving an input from at least one of an operator and a program for changing a position of one of a light source arranged in the virtual space, a position of the object, and a position of the light source and the position of the object;
   obtaining from the input received data of one of an absolute position of said light source and data of a relative position of the light source with respect to said object;
   selecting from a plurality of data sets relating to a shadow corresponding to preset light source positions and calculated for all vertexes of said object and stored in advance for a specific element of said object a data set relating to the shadow relating to the obtained data of the absolute position of the light source or data of the relative position of the light source;
   interpolating from a plurality of data sets relating to the shadow based on one of the obtained data of the absolute position of the light source and data of the relative position of the light source to generate an interpolated shadow data set when there are a plurality of data sets relating to shadow selected; and
   using the interpolated shadow data set to draw the object in the virtual space.

40. The method of claim 39, wherein, the absolute light source position, relative light source position, and viewpoint position may be different.

41. A method of rendering an object in a virtual space, comprising:
   receiving an input from at least one of an operator and a program for changing one of a direction of light of a light source arranged in the virtual space, and a position of the object, and the direction of light of the light source and the position of the object;
   obtaining from one of the received input data of an absolute direction of said light and data of a relative direction of said light with respect to said object;
   selecting from a plurality of data sets relating to a shadow corresponding to preset directions of light and calculated for all vertexes of said object and stored in advance for a specific element of said object a data set relating to the shadow relating to the obtained data of the absolute position of the light or data of the relative position of the light;
   interpolating from a plurality of data sets relating to the shadow based on the obtained data of said one of said absolute direction of the light and said relative direction of the light to generate an interpolated shadow data set when there are a plurality of data sets relating to said selected shadow; and
   using the interpolated shadow data set to draw the object in the virtual space.

42. The method of claim 41, wherein, the absolute light source position, relative light source position, and viewpoint position may be different.

43. A computer readable program product storing a program for calculating data relating to shadow of an object in a virtual space,
   said program making said computer
   receive an input from at least one of an operator and a program for changing one of a position of a light source arranged in the virtual space, and a position of the object, and a position of the light source and the position of the object;
   obtain from the received input data of one of an absolute position of said light source and a relative position of the light source with respect to said object;
   select from a plurality of data sets relating to a shadow corresponding to preset light source positions and calculated for all vertexes of said object and stored in advance for a specific element of said object a data set relating to the shadow relating to the obtained data of said one of said absolute position of the light source and said relative position of the light source;
   interpolate from a plurality of data sets relating to the shadow based on the obtained data of said one of said absolute position of the light source and said relative position of the light source to generate an interpolated shadow data set when there are a plurality of data sets relating to said selected shadow; and
   instruct use of the interpolated shadow data set to draw the object in the virtual space.

44. The program of claim 43, wherein, the absolute light source position, relative light source position, and viewpoint position may be different.

45. A computer readable program product storing a program for calculating data relating to shadow of an object in a virtual space,
   said program making said computer
   receive input from one of an operator and a program for changing one of a direction of light of a light source arranged in the virtual space, a position of the object, and the direction of light of the light source and the position of the object;
   obtain from the received input data of one of an absolute direction of said light and data of a relative direction of said light with respect to said object;
   select from a plurality of data sets relating to a shadow corresponding to preset directions of light and calculated for all vertexes of said object and stored in advance for a specific element of said object a data set relating to the shadow relating to the obtained data one of the absolute position of the light and data of the relative position of the light;

interpolate from a plurality of data sets relating to shadow based on the obtained data of said one of said absolute direction of the light and said relative direction of the light to generate an interpolated shadow data set when there are a plurality of data sets relating to shadow selected; and instruct use of the interpolated shadow data set to draw the object in the virtual space.

46. The program of claim 45, wherein, the absolute light source position, relative light source position, and viewpoint position may be different.

47. An apparatus for rendering an object in a virtual space, comprising:

a system that receives input from at least one of an operator and a program for changing one of a position of a light source arranged in the virtual space, a position of the object, and a position of the light source and the position of the object;

a system that obtains, from the received input data of one of an absolute position of said light source and a relative position of the light source with respect to said object;

a selector that selects from a plurality of data sets relating to a shadow corresponding to preset light source positions and calculated for all vertexes of said object and stored in advance for a specific element of said object a data set relating to the shadow relating to the obtained data of said one of absolute position of the light source and data of the relative position of the light source;

a generator that interpolates from a plurality of data sets relating to the shadow based on the obtained data of one of said absolute position of the light source and said relative position of the light source to generate an interpolated shadow data set when there are a plurality of data sets relating to shadow selected; and a system that uses the interpolated shadow data set to draw the object in the virtual space.

48. The apparatus of claim 47, wherein, the absolute light source position, relative light source position, and viewpoint position may be different.

49. An apparatus for rendering an object in a virtual space, comprising:

a system that receives an input from at least one of an operator and a program for changing a direction of light of a light source arranged in one of the virtual space, a position of the object, and the direction of light of the light source and the position of the object;

a system that obtains from the received input data of one of an absolute direction of said light and a relative direction of said light with respect to said object;

a selector that selects from a plurality of data sets relating to a shadow corresponding to preset directions of light and calculated for all vertexes of said object and stored in advance for a specific element of said object a data set relating to the shadow relating to the obtained data of said one of the absolute position of the light and the relative position of the light;

a generator that interpolates from a plurality of data sets relating to shadow based on the obtained data of said one of the absolute direction of the light and the relative direction of the light to generate an interpolated shadow data set when there are a plurality of data sets relating to shadow selected; and a system that uses the interpolated shadow data set to draw the object in the virtual space.

50. The apparatus of claim 49, wherein, the absolute light source position, relative light source position, and viewpoint position may be different.

51. A game system for rendering an object in a virtual space, comprising:

a computer and a computer readable program product storing a program for making said computer execute processing for receiving input from at least one of an operator and a program for changing one of a position of a light source arranged in the virtual space, a position of the object, and a position of the light source and the position of the object, processing for obtaining from the received input data of one of an absolute position of said light source and a relative position of the light source with respect to said object, processing for selecting from a plurality of data sets relating to a shadow corresponding to preset light source positions and calculated for all vertexes of said object and stored in advance for a specific element of said object a data set relating to shadow relating to the obtained data of said one of the absolute position of the light source and the relative position of the light source, processing for interpolating from a plurality of data sets relating to the shadow based on the obtained data of said one of the absolute position of the light source and the relative position of the light source to generate an interpolated shadow data set when there are a plurality of data sets relating to shadow selected, and processing for using the interpolated shadow data set to draw the object in the virtual space.

52. The game system of claim 51, wherein, the absolute light source position, relative light source position, and viewpoint position may be different.

53. A game system for rendering an object in a virtual space, comprising:

a computer and a computer readable program product storing a program for making a computer execute processing for receiving input from at least one of an operator and a program for changing one of a direction of light of a light source arranged in the virtual space, a position of the object, and the direction of light of the light source and the position of the object, processing for obtaining from the received input data of one of an absolute direction of said light and a relative direction of said light with respect to said object, processing for selecting from a plurality of data sets relating to shadow corresponding to preset directions of light and calculated for all vertexes of said object and stored in advance for a specific element of said object a data set relating to a shadow relating to the obtained data of one of the absolute position of the light and the relative position of the light, processing for interpolating from a plurality of data sets relating to the shadow based on the obtained data of said one of the absolute direction of the light and the relative direction of the light to generate an interpolated shadow data set when there are a plurality of data sets relating to the selected shadow, and processing for using the interpolated shadow data set to draw the object in the virtual space.

54. The game system of claim 30, wherein, the absolute light source position, relative light source position, and viewpoint position may be different.

* * * * *

UNITED STATES PATENT AND TRADEMARK OFFICE
CERTIFICATE OF CORRECTION

PATENT NO.     : 6,529,194 B1
DATED          : March 4, 2003
INVENTOR(S)    : Akihiro Yamaguchi It is certified that error appears in the above-identified patent and that said Letters Patent is hereby corrected as shown below:

<u>Column 38,</u>
Line 3, "claim 30" should be -- claim 53 --.

Signed and Sealed this

Twenty-seventh Day of January, 2004

JON W. DUDAS
*Acting Director of the United States Patent and Trademark Office*